United States Patent
Lee et al.

(10) Patent No.: US 11,595,289 B2
(45) Date of Patent: Feb. 28, 2023

(54) NETWORK TESTING USING A PROGRAMMABLE PACKET ENGINE

(71) Applicant: Barefoot Networks, Inc., Santa Clara, CA (US)

(72) Inventors: Jeongkeun Lee, Mountain View, CA (US); Georgios Nikolaidis, Mountain View, CA (US); Andre Lam, San Jose, CA (US); Remy Chang, Milpitas, CA (US); Joon-Myung Kang, Dublin, CA (US); Ashkan Nikravesh, San Jose, CA (US); Ramkumar Krishnamoorthy, Cupertino, CA (US); Alain Loge, South Lake Tahoe, CA (US)

(73) Assignee: Barefoot Networks, Inc., Santa Clara, CA (US)

(*) Notice: Subject to any disclaimer, the term of this patent is extended or adjusted under 35 U.S.C. 154(b) by 197 days.

(21) Appl. No.: 16/833,227

(22) Filed: Mar. 27, 2020

(65) Prior Publication Data
US 2020/0313999 A1    Oct. 1, 2020

Related U.S. Application Data

(60) Provisional application No. 62/828,361, filed on Apr. 2, 2019, provisional application No. 62/826,873, filed on Mar. 29, 2019, provisional application No. 62/826,893, filed on Mar. 29, 2019, provisional application No. 62/826,900, filed on Mar. 29, 2019, provisional application No. 62/826,908, filed on Mar. 29, 2019, provisional application No. 62/826,914, (Continued)

(51) Int. Cl.
*H04L 12/26* (2006.01)
*H04L 43/106* (2022.01)
*H04L 43/50* (2022.01)
*H04L 69/22* (2022.01)

(52) U.S. Cl.
CPC ............ *H04L 43/50* (2013.01); *H04L 43/106* (2013.01); *H04L 69/22* (2013.01)

(58) Field of Classification Search
CPC ....... H04L 43/50; H04L 43/106; H04L 69/22; H04L 1/24; H04L 41/0645; H04L 43/10; H04L 43/18; H04L 43/55; H04L 61/2575; H04L 61/2589; H04L 43/02; H04L 49/9042; H04L 69/04; G06F 11/3668; H04B 3/46; H04J 2203/0062; H04M 3/22; H04N 21/4394; H04N 21/44008; H04Q 2011/0083; H04W 28/06
USPC ........................................................ 370/252
See application file for complete search history.

(56) References Cited

U.S. PATENT DOCUMENTS 10,050,854 B1 *  8/2018  Licking .................. H04L 43/16
10,587,491 B1 *  3/2020  Volpe ..................... H04L 43/10
(Continued)

*Primary Examiner* — Gbemileke J Onamuti
(74) *Attorney, Agent, or Firm* — Essential Patents Group, LLP.; Christopher K. Gagne

(57) ABSTRACT

Embodiments described herein describe a network tester that is configured to perform packet modification at an egress pipeline of a programmable packet engine. A packet stream is received at an egress pipeline of an output port of the programmable packet engine, wherein the output port includes a packet modifier. Packets of the packet stream are modified at the packet modifier. The packet stream including modified packets is transmitted through an egress pipeline of the output port.

23 Claims, 20 Drawing Sheets

Related U.S. Application Data filed on Mar. 29, 2019, provisional application No. 63/000,362, filed on Mar. 26, 2020.

(56) References Cited

U.S. PATENT DOCUMENTS

| | | | |
|---|---|---|---|
| 2007/0223388 A1* | 9/2007 | Arad | ........................ H04L 43/50 370/242 |
| 2013/0166960 A1* | 6/2013 | Das | ......................... H04L 43/50 714/E11.159 |

* cited by examiner

NETWORK TESTING USING A PROGRAMMABLE PACKET ENGINE

RELATED APPLICATIONS

This application claims the benefit of priority of the following U.S. Provisional application 62/826,873 filed Mar. 29, 2019 (BRFT-003), 62/826,893 filed Mar. 29, 2019 (BRFT-004), 62/826,900 filed Mar. 29, 2019 (BRFT-005), 62/826,908 filed Mar. 29, 2019 (BRFT-006), 62/826,914 filed Mar. 29, 2019 (BRFT-007), 62/828,361 filed Apr. 2, 2019 (BRFT-008), and 63/000,362 filed Mar. 26, 2020 (BRFT.0010.PROV). The contents of those applications are incorporated herein in their entirety.

DESCRIPTION

Networks of interconnected devices, such as telecommunications networks or computer networks, provide digital data transmission between the interconnected devices. Such networks are omnipresent in today's world, and provide data transmission for many different types of networks, such as local area networks (LANs), wireless networks, cellular networks, and the Internet. As the world becomes increasingly reliant on networks of interconnected devices, the need to ensure that networks are providing the requisite service quality has become more essential.

In order to test the performance of a network and network devices in the network, various network metrics can be measured. Examples of measurements of network performance include bandwidth, throughput, latency, jitter, error rate, etc. Performance of networks is also evaluated according to various benchmarking methodologies governed by various standards committees, such as RFC 2544 (Benchmarking Methodology for Network Interconnect Devices), RFC 2889 (Benchmarking Methodology for LAN Switching Devices), and RFC 3819 (Methodology for IP Multicast Benchmarking).

BRIEF DESCRIPTION OF THE DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

DETAILED DESCRIPTION

Figure 1A:
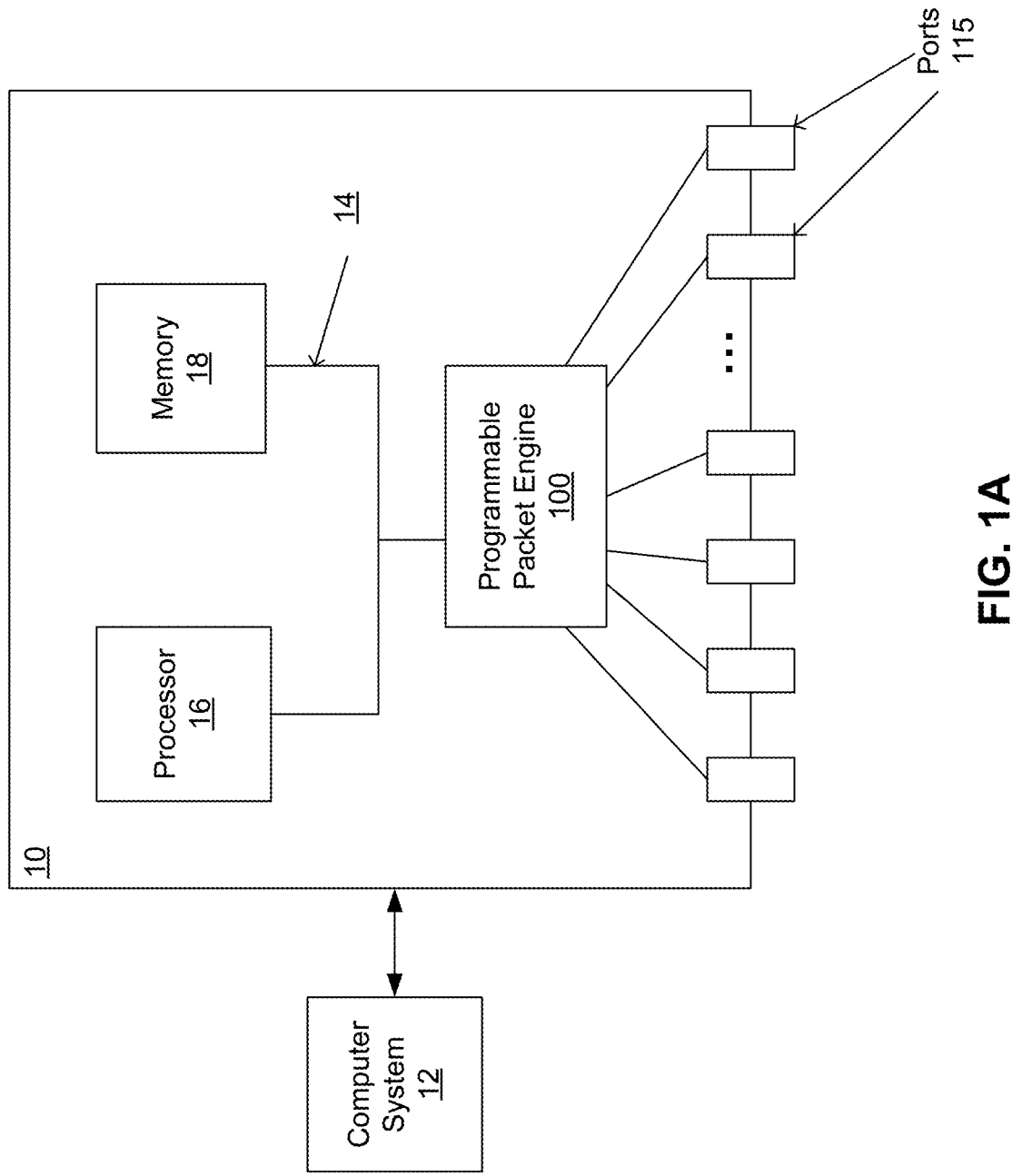
FIG. 1A is a block diagram illustrating an example network tester including a programmable packet engine.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Some portions of the detailed descriptions which follow are presented in terms of procedures, logic blocks, processing and other symbolic representations of operations on data within an electrical device. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical signals capable of being stored, transferred, combined, compared, and otherwise manipulated in an electrical device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "generating," "receiving," "determining," "transmitting," "comparing," "initiating," or the like, refer to the actions and processes of an electronic device such as computing device or a programmable packet engine.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example network tester and/or programmable packet engine described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, host processor(s) or core(s) thereof, programmable packet engines, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a programmable packet engine and a microprocessor, a plurality of microprocessors, one or more microprocessors in conjunction with a programmable packet engine, or any other such configuration.

Network testers are computing devices that are used for the testing of connected devices and/or connected networks. In performing network testing operations, it is sometimes desired to use multiple network testers simultaneously to perform network testing. In order to ensure the accuracy and consistency of any testing results, the synchronization of packet transmission across the multiple network testers can be relevant.

Network tester devices are traffic generation and measurement devices that are used for the testing of connected devices and/or connected networks. For example, a network tester is connected to a device under test (DUT) (e.g., switch, router, endpoint receiver) using input/output (I/O) ports of each device. The network tester transmits data traffic to the DUT and receives data traffic from the DUT for testing the performance of the DUT. The network tester is configured to test performance of the DUT, e.g., according to the benchmarking methodologies supported by the network tester.

Embodiments described herein provide a network tester including a programmable packet engine, also referred to as a programmable forwarding element, for performing network testing operations. An example programmable packet engine is compatible with the Protocol Independent Switch Architecture (PISA). A programmable packet engine can include a programmable forwarding plane, in which a programming language, e.g., Programming Protocol-independent Packet Processors (P4), is used to program the operation of the programmable packet engine.

A programmable packet engine can be programmable by configuring software executed by the forwarding element. A device user, testing engineer, control plane, or device manufacturer can load the configuration software into the packet engine. In some embodiments, the programmable packet engine is protocol independent (e.g., layer 2 and above) because the packet engine has no awareness of the network protocols it supports. Rather, the software provides the instructions for handling any supported protocol. When support for a new protocol is required, new logic is added to the program. For instance, using programmable packet engines, a programmer can add features or functions to the programable packet engine by programming the programmable packet engine to perform these features or functions.

Programmable packet engines deployed as programmable network switches also allow for the elimination of redundant equipment. For example, typical data-centers deploy conventional network testers to perform network testing operations. These types of conventional network testers are limited in role and provide very specific functionality. With programmable packet engines deployed as programmable network switches, in accordance with some embodiments, functions of conventional network testers can be performed by a programmable network switch without the additional hardware components. In some cases, the programmable packet engines can be configured at one time to operate as a network tester and at other times to operate as a forwarding device, or to operate as a network tester and a forwarding device at the same time.

Programmable packet engines as used within a network tester, in accordance with embodiments, allow for the creation and deployment of new protocols that are customized according to application demand, as well as the removal of unused protocols, for simplifying and streamlining network communication. Functionality normally associated with network testers or other applications can also be implemented directly in the network by programming these functions directly into the programmable packet engines.

Embodiments described herein leverage the benefits of programmable packet engines into network testers, thereby providing network testing functionality capable of performing many network testing functions in a cost effective and programmable manner. Currently, typical network testers are either high-end appliances including many features at a high per-port cost or low-end network testers that provide low performance. Embodiments described herein provide a network tester using a programmable packet engine and provide high performance with high port density and easy programmability, e.g., for adding new protocols or functions.

Embodiments described herein provide a network tester including a programmable packet engine that provides at least the following: support of multiple users; Start/Stop sending/receiving traffic on a port; add, modify, delete stream for sending; or add, modify, delete a classifier for statistics and capturing.

Various example network testers are configured to generate traffic to provide to a DUT for various network testing operations. For example, in some embodiments, the DUT provides packets back to a network tester device for verification, or the DUT may forward traffic to a network of other devices, and some of the forwarded traffic may return to the network tester. The network tester can be configured to test at least the following various network conditions, including: network performance (e.g., the capability of configuring ports at different speeds, packet sizes, etc.), network congestion (e.g., packets dropped and/or delayed), network latency and jitter, validation of network topology (e.g., load balancing), control plane verification, etc.

In some embodiments, a plurality of network testers can be used as a distributed network tester system, where the network testers of the distributed network testers operate to collectively perform network testing operations. For example, the set of distributed network testers can be configured to inject traffic into a network-under-test (NUT), which routes packets within the NUT. The NUT may transmit some packets to some of the network testers of the distributed network tester so that tester can discern these NUT-generated packets that are not generated by the tester. The NUT may generate packets by itself for any reason (normal application traffic from servers or routing/control packets generated by switches/routers, and some of these packets may arrive at the tester. In some examples, a single programmable packet engine can be configured to emulate a plurality of network testers.

Network Tester

FIG. 1A is a block diagram of an example network tester 10 including a programmable packet engine 100, according to some embodiments. It is appreciated that network tester 10 of FIG. 1A is only an example and that embodiments as described herein can operate on or within a number of different network testers including different components. In some embodiments, network tester 10 of FIG. 1 is to be coupled to a remote computer system 12 for receiving and transmitting communications, such as commands and data using packets.

A packet may be used herein to refer to various formatted collections of bits that may be sent across a network, using one or more of: Ethernet (IEEE 802.3), remote direct memory access (RDMA), InfiniBand, Internet Wide Area RDMA Protocol (iWARP), User Datagram Protocol (UDP), quick UDP Internet Connections (QUIC), RDMA over Converged Ethernet (RoCE). Also, as used in this document, references to L2, L3, L4, and L7 layers (or layer 2, layer 3, layer 4, and layer 7) are references respectively to the second data link layer, the third network layer, the fourth transport layer, and the seventh application layer of the OSI (Open System Interconnection) layer model. A packet header can be an entire header or portion of a header of a packet, e.g., the combination of all the protocol headers. The packet header can be an ordered set. A protocol header can be a collection of header fields. A protocol header can be an ordered set. A header field can include a single header field and a combination of name and a length.

Network tester 10 of FIG. 1A includes an address/data bus 14 for communicating information, and a processor 16 coupled with bus 14 for processing information and instructions. It should be appreciated that network tester 10 is also suited to a multi-processor environment in which a plurality of processors 16 are present. Conversely, network tester 10 is also well suited to having a single processor such as, for example, processor 16. Processor 16 may be any of various types of microprocessor, CPU, core, field programmable gate array (FPGA), programmable control logic (PLC), and so forth. Network tester 10 also includes data storage features such as a memory 18. It should be appreciated that memory 18 can include computer usable volatile memory, e.g., random access memory (RAM), static RAM (SRAM), ternary content-addressable memory (TCAM), double data rate compatible (DDR) memory, or high-bandwidth memory (HBM), coupled with bus 14 for storing information and instructions for processor 16 and/or computer usable non-volatile memory, e.g., read only memory (ROM), coupled with bus 14 for storing static information and instructions for processor 16.

Network tester 10 can receive input through an alphanumeric input device (e.g., keyboard or touch screen interface) and or a cursor control device communicating user input information and command selections. In some embodiments, network tester 10 can include a display device for displaying information. In other embodiments, user input information and commands selections are received at a computer system 12, and computer system 12 includes a display for displaying information.

Network tester 10 also includes a programmable packet engine 100 including a plurality of input and/or output ports 115. A port can be a physical port of a forwarding engine or a DUT. In some examples, a DUT can include a programmable packet engine.

A protocol daemon is a process that implements a protocol within the network operating system. In order to divert incoming packets to a protocol daemon, a packet filter can be configured to divert packets to the protocol daemon for appropriate ports. On the other hand, a protocol daemon can send a packet by instantiating a stream. In some embodiments, a daemon-generated stream is distinguished from a line-rate stream. A protocol daemon can receive path updates (e.g., Border Gateway Protocol (BGP)) from other network elements to determine updated path routers. Various embodiments can test changes of forwarding path for a BGP update by sending traffic, sending a BGP packet that is supposed to trigger some different behavior at the DUT, and then sending traffic again to check whether the expected behavior actually takes place based on a path of a packet back to the sender (network tester).

Figure 1B:
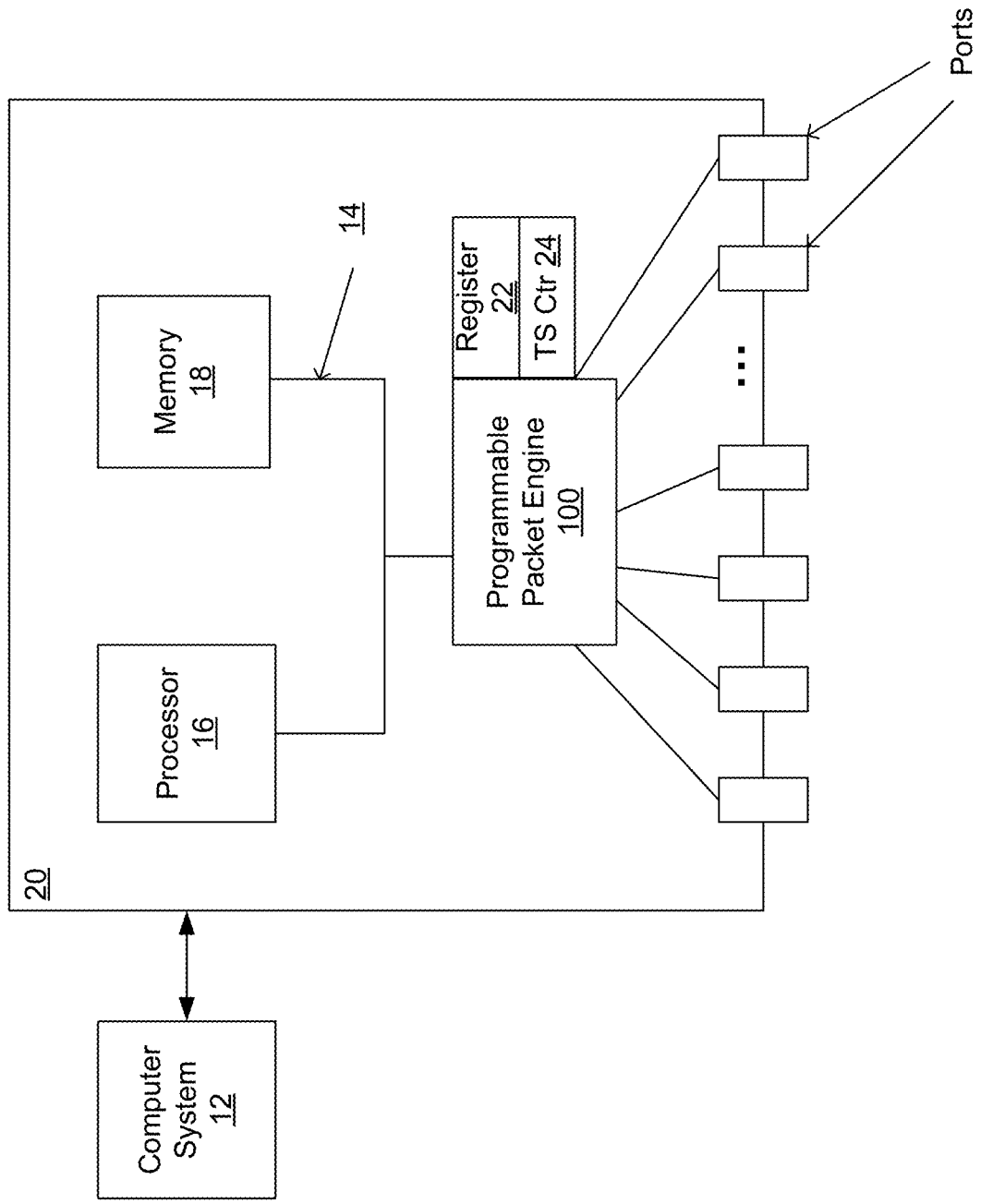
FIG. 1B depicts an example network tester including a programmable packet engine.

FIG. 1B depicts a block diagram of an example network tester 20 including a programmable packet engine 100, according to some embodiments. Embodiments described herein provide for the synchronization of packet operations across multiple programmable packet engines. A programmable packet engine can include a timestamp counter (e.g., timestamp counter 24) for providing timestamp information and a register (e.g., register 22) communicatively coupled to the timestamp counter. The registers for a programmable packet engine are communicatively coupled to a remote controller (e.g., computer system 12). The remote controller can be configured to provide a timestamp value into the register via an interface or bus. The remote controller can send the same timestamp value to multiple programmable packet engines. Upon receipt of a load signal from the remote controller, where the load signal is sent to one or more programmable packet engines at the same moment, one or more programmable packet engines load the timestamp value from the register into the timestamp counter, overwriting the current timestamp counter value. In this way, the timestamp counter for each programmable packet engine is synchronized to the same counter value at the same moment.

Figure 2A:
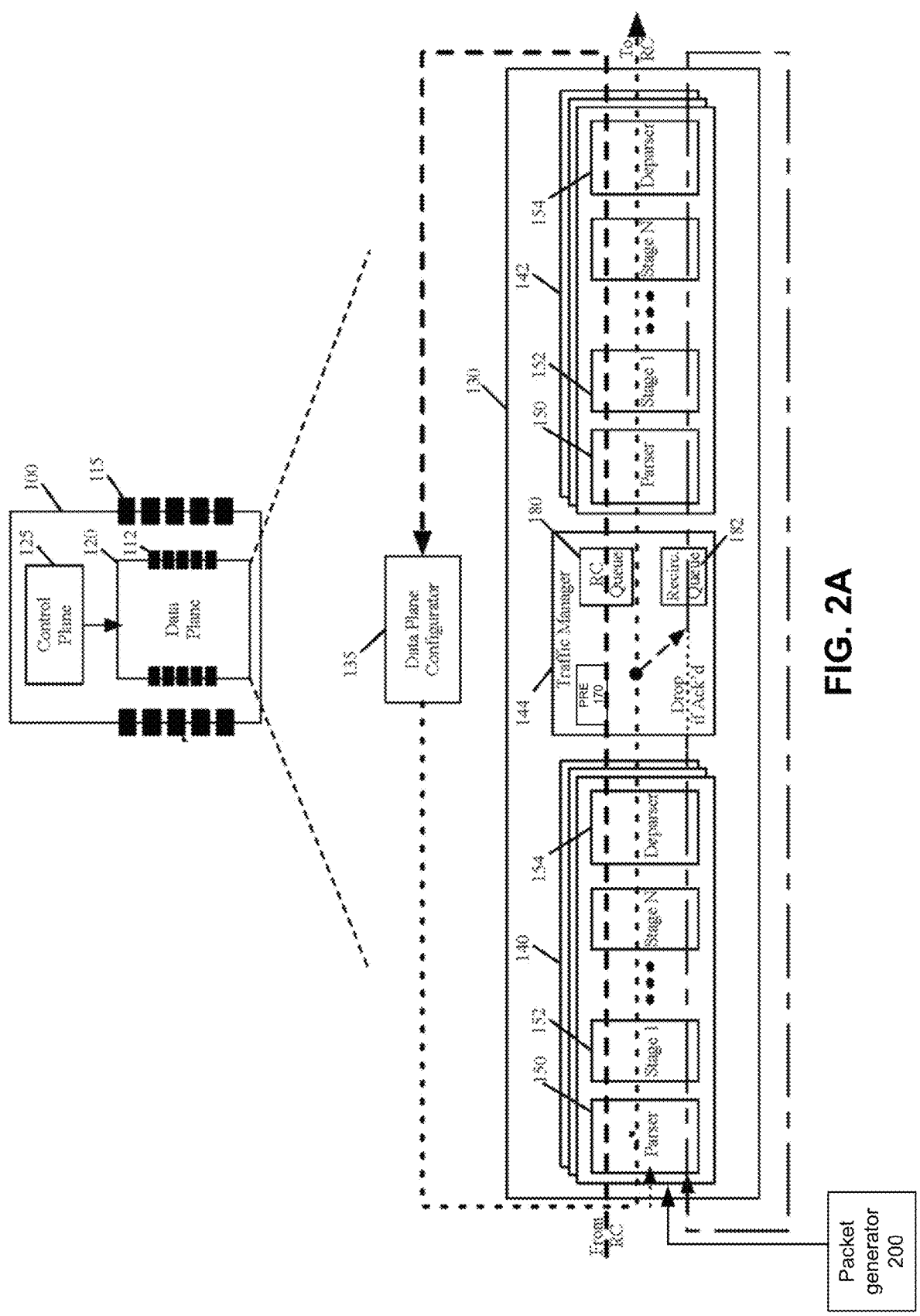
FIGS. 2A-2D depict block diagrams of a programmable packet engine.

FIG. 2A illustrates an example of a programmable packet engine 100. The programmable packet engine 100 can be any type of programmable forwarding element. The programmable packet engine 100 can be configured to forward data messages to a network of connected devices. In some embodiments, programmable packet engine 100 is deployed within a network tester for performing network testing operations. When configured as a network tester, programmable packet engine 100 transmits data messages to at least one device under test (DUT) to which it is communicatively coupled. It should be appreciated that the programmable packet engine can be communicatively coupled to the DUT directly, or via a network of interconnected devices (e.g., other forwarding elements). In some examples, when configured as a network tester, programmable packet engine 100 transmits data messages to a network under test (NUT).

As shown in FIG. 2A, the programmable packet engine 100 includes (1) physical ports 115 that receive data messages from, and transmit data messages to, devices outside of the programmable packet engine, (2) a data-plane forwarding circuit ("data plane") 120 that perform the forwarding operations of the programmable packet engine 100 (e.g., that receive data messages and forward the data messages to other devices), and (3) a control-plane circuit ("control plane") 125 that provides a configuration interface for configuring the forwarding behavior of the data plane forwarding circuit.

As further shown, the data plane 120 includes ports 112, configurable message processing circuits 130 and a data-plane configurator 135. In some embodiments, several ports 112 receive data messages from and forward data messages to ports 115 of the programmable packet engine 100. For instance, in some embodiments, N data-plane ports 112 (e.g., 4 ports 112) are associated with each port 115 of the programmable packet engine. The N-ports 112 for each port 115 are viewed as N-channels of the port 115. In some embodiments, several data-plane ports 112 are associated with other modules (e.g., data plane configurator) of the data plane 120.

The configurable message-processing circuits 130 perform the configurable data-plane forwarding operations of the programmable packet engine to process and forward data messages to their destinations. The data-plane configurator 135 can be a processor-executed driver that configures configurable message-processing circuits 130 based on configuration data supplied by the control-plane circuit 125. The data-plane configurator 135 can also configure these circuits 130 based on configuration data messages that the data plane 120 receives in-band from the remote controller 105.

In some embodiments, the configurable message-forwarding circuits 130 of the data plane include several ingress processing pipelines 140, several egress processing pipelines 142, and a traffic management stage 144 between the ingress and egress processing pipelines 140 and 142. In some embodiments, each ingress or egress pipeline is associated with one or more physical ports 115 of the programmable packet engine 100. Also, in some embodiments, each ingress or egress pipeline is associated with several data-plane ports 112.

Also, in some embodiments, an ingress or egress pipeline includes a parser 150, several message-processing stages 152, and a deparser 154. A pipeline's parser 150 extracts a message header from a data message that the pipeline receives for processing. In some embodiments, the extracted header is in a format of a header vector (HV), which can be modified by successive message processing stages as part of their message processing operations. The parser of a pipeline passes the payload of the message to the deparser 154 as the pipeline's message processing stages 152 operate on the header vectors. When a pipeline finishes processing a data message and the message has to be provided to the traffic management stage 144 (in case of an ingress pipeline) or to a port 112 to forward to a port 115 (in case of an egress pipeline) to be forwarded to the message's next hop (e.g., to its destination compute node or next forwarding element), a deparser of the pipeline in some embodiments produces the data message header from the message's header vector that was processed by the last message processing stage, and combines this header with the data message's payload.

The operations of the data plane's message processing stages are configured by a local or remote control plane in some embodiments. In some embodiments, a local control plane is implemented by a control software layer that is executed by one or more general purpose processors (e.g., CPUs) of the forwarding element, while a remote control plane is implemented by control software layer executing by one or more CPUs of another forwarding element or a remote computer (e.g., server). For example, Appendix 1 includes an example programmer's guide for configuring programmable packet engine 100 to perform any of packet generation, packet modification, state injection, or packet classification.

When programmable packet engine 100 is configured as a network tester, various manners of generating packets to be sent to a DUT or devices of a NUT are described herein. In some modes, control plane 125 generates one or more packets and injects test packets into ingress processing pipelines 140, for forwarding to RC queue 180 or 182 of TM 144, and to egress processing pipeline 142. In some examples, a test packet can be re-circulated using racetrack pipelines allocated among ingress processing pipelines 140 and egress processing pipeline 142 and through TM 144. To increase a supply of test packets, TM 144 can cause the test packets to recirculate through the racetrack pipelines and create a copy using a packet replication engine of a packet during recirculation (or before a recirculation) and inject the copied packet into the racetrack pipelines. Accordingly, TM 144 can cause copies of test packets to be made of test packets and copies of test packets (and copies of copies of test packets) to recirculate through racetrack pipelines.

A CPU (e.g., control plane 125) can generate one or more test packets, and message processing circuits 130 use packet replication engine (PRE 170) to create copies of those test packets during re-circulation. For example, control plane 125 can create a prototype test packet to re-circulate (e.g., IP packet with a destination and source address). A CPU can also be freed to perform other tasks than generating test packets. Copying of recirculated test packets using message processing circuits 130 can achieve faster generation of test packets than were a CPU or control plane to generate test packets.

In some examples, instead of or in addition control plane 125 injecting one or more test packets into data plane 120, packet generator 200 can generate one or more test packets for circulation and the one or more test packets can be duplicated by programmable packet engine 100. Packet generator 200 can provide one or more test packets to one or more ingress processing pipelines 140 or a "racetrack port" (described herein). In some examples, a CPU (e.g., control plane 125) can configure various packets that packet generator 200 can generate and inject for circulation and re-circulation. If packet generator 200 uses a buffer to store test packets, a limited buffer space may limit patterns available for test packets. However, in some cases, a CPU can have greater flexibility as to content packets to inject. A greater array of test packets can allow for more realistic testing to emulate traffic on a network. Some test packet patterns could be used to reveal bugs or errors in configuration of a DUT or NUT. For example, a succession of packets cause problems (e.g., short packet, large packet, short packet) could be configured by packet generator 200 or a CPU.

In some examples, RC queues 180 or 182 are used to store streams of test packets to be sent out to a DUT or NUT. If an amount of test packets available to egress from RC queues 180 or 182 to a DUT or NUT are sufficiently large to achieve a desired output test packet transmit rate (e.g., Gbps), then TM 144 can allow test packets to egress through an egress processing pipeline 142 and an output port to a DUT or NUT. A transmit rate from RC queues 180 or 182 can be regulated to achieve a desired output transmit rate of test packets. In some examples, a time specification can apply to a stream information such as number of packets, Inter-Burst Gap, Inter-Frame Gap. Stream rates can be specified either in packets per second (PPS) or transmit rate (e.g., Kbps, Mbps, Gbps).

Figure 2B:
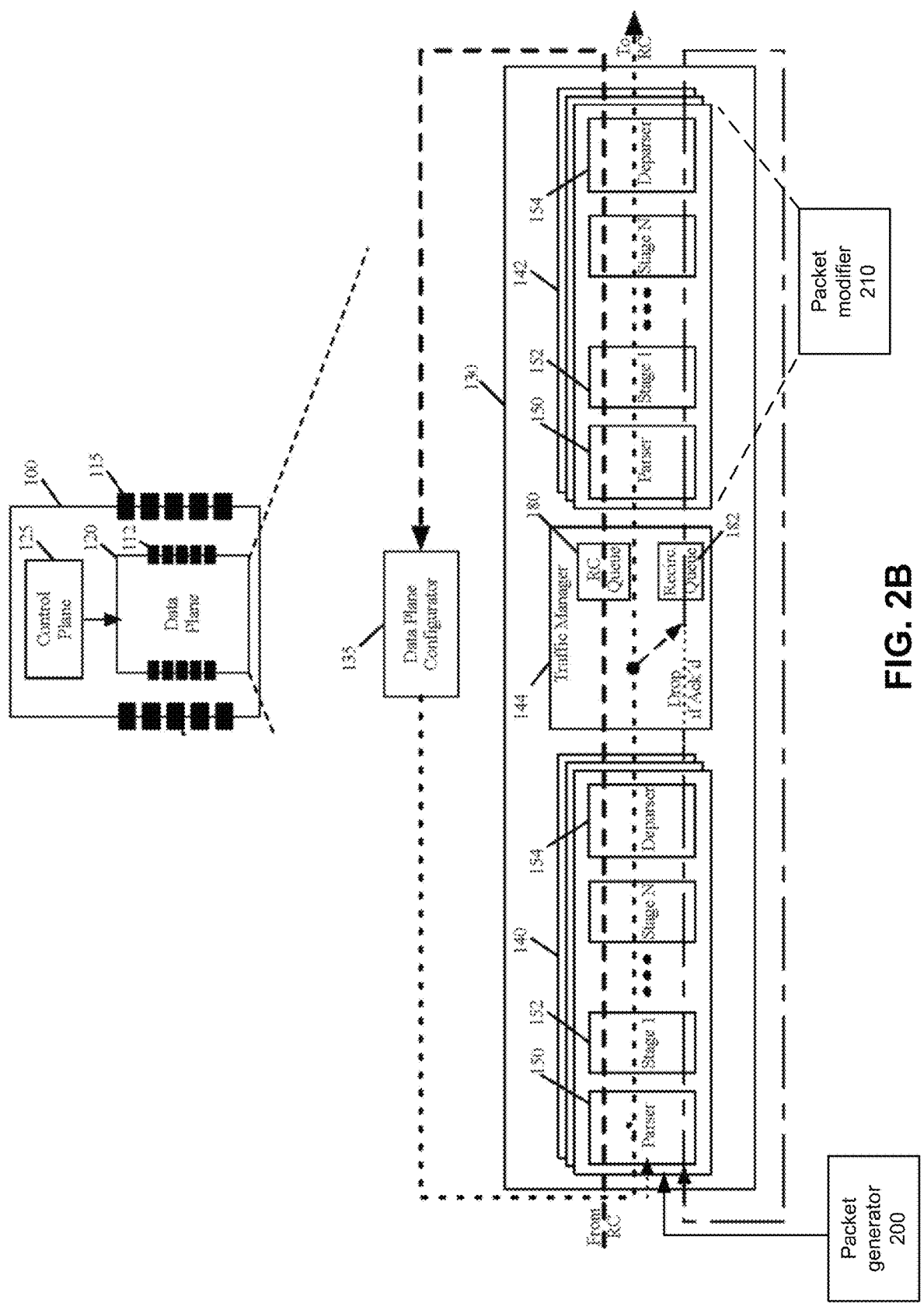

In some examples, a test packet is modified by egress processing pipeline 142 prior to transmission through a port to a DUT or devices in a NUT. FIG. 2B depicts a programmable packet engine, according to some embodiments. In this example, for test packets that are to be transmitted to a DUT or devices in a NUT, egress processing pipeline 142 is configured to perform packet modification as packet modifier 210. Packet modifier 210 can modify one or more fields of a test packet. For example, one or more match action units (MAUs) of egress processing pipeline 142 can perform or implement packet modifier 210 by determining if a packet belongs to a stream and/or port and if so, performing an action of modifying a particular header field or fields of a test packet. Control plane 125 can program MAUs to perform the match and action. One example match-action operation can be if a packet belongs to stream A, increment the destination IP address up to a maximum value. Other examples of packet modification are described herein.

In some examples, packet modifier 210 can modify packets in a stream or from one or more ports so that network tester (e.g., programmable packet engine 100) emulates multiple devices sending packets to a DUT or devices in a NUT. A user or control plane can create multiple modifiers on different header fields of a same stream and/or port, for example, to emulate multiple IP hosts, with a host generating various TCP/UDP flows over a range of L4 source and destination port numbers.

Packet modifier 210 can modify certain header fields to vary the field value in outgoing packets. For example, one or more of the following header fields can be modified: Ethernet source MAC address, IPv4 destination address, IPv6 destination address, UDP source port, and so forth. In some examples, the modifier takes a tuple of [start, step, end] to increment or decrement the field value from the start to the end by the step size. In some embodiments, a modifier may apply the same value to a number of packets before changing the field value based on a number of packet parameters. When multiple modifiers are specified, they may be executed in parallel. In other embodiments, hierarchical execution of modifiers (e.g., nested loops, one loop for each modifier) is performed.

For example, packet modifier 210 can process an output stream, which is identified by a combination of a stream and a port. In some embodiments, a modifier can be applied for a stream-port combination. For a given stream-port combination, one or more one modifiers can be created for a packet header field. A field can be associated with a modifier. In some embodiments, to avoid ambiguity in cases where more than one instance of the same protocol exist, users specify the term inner for the second occurrence of the same protocol family. For example, in the case of IPv6inIPv4, IPv6 is still specified as inner layer (encapsulated protocol layer).

A flow can be a sequence of packets being transferred between two endpoints, generally representing a single session using a known protocol. Accordingly, a flow is identified by a set of defined tuples and, for routing purpose, a flow is identified by the two tuples that identify the endpoints (e.g., the source and destination addresses). For content based services (Load balancer, firewall, Intrusion detection system etc.), flows can be discriminated at a finer granularity by using five or more tuples {Source address, destination address, IP protocol, transport layer source port, and destination port}. A packet in a flow is expected to have the same set of tuples in the packet header.

In some examples, packet modifier 210 can dynamically adjust forward error correction (FEC) level on a link in response to bit error rate (BER) or the like (e.g., symbol errors, runt frames and so forth). Packet modifier 210 can add erasure coding for prior packets of that flow.

For example, if multiple transmission control protocol (TCP) flows are to be tested, the destination port number can be incremented, increased, or changed with every packet using packet modifier 210. For L2 flows, MAC addresses can be modified or altered every n packets, where n is an integer. Note that packet classifier 230 or 240 (FIG. 2D) can be used to identify a set of packets belonging to the same flow and apply actions such as count if there is a range hit or capture (e.g., send to a control plane for inspection or identification to a user).

A stream can be a sequence of packets with an associated packet-size distribution, a rate and a set of headers. This sequence can be defined by a user by using a set of field modifiers (e.g., increment a field, set the value of a field). A stream can include: a packet header, which is the set of protocol headers for the stream, and a packet size or packet size distribution or range. Streams are not necessarily tied to a port but can be tied to a port. Depending on a user's definition of a flow, a stream may include multiple flows. Streams can also be continuous or finish after a specified number of packets or a set time.

To distinguish streams from one another, stream identifiers may be added in the header or payload of the generated packets. In some examples, a state injector can inject a stream identifier into a packet. A stream can be a sequence of frames with a notion of how/when these frames should be transmitted and the frames can share a packet specification and a time specification. Packet specification can describe the packet format (e.g., packet length, headers) while time specification can specify transmission characteristics (e.g., rate, burst, Inter-Frame Gap, etc.).

Figure 2C:
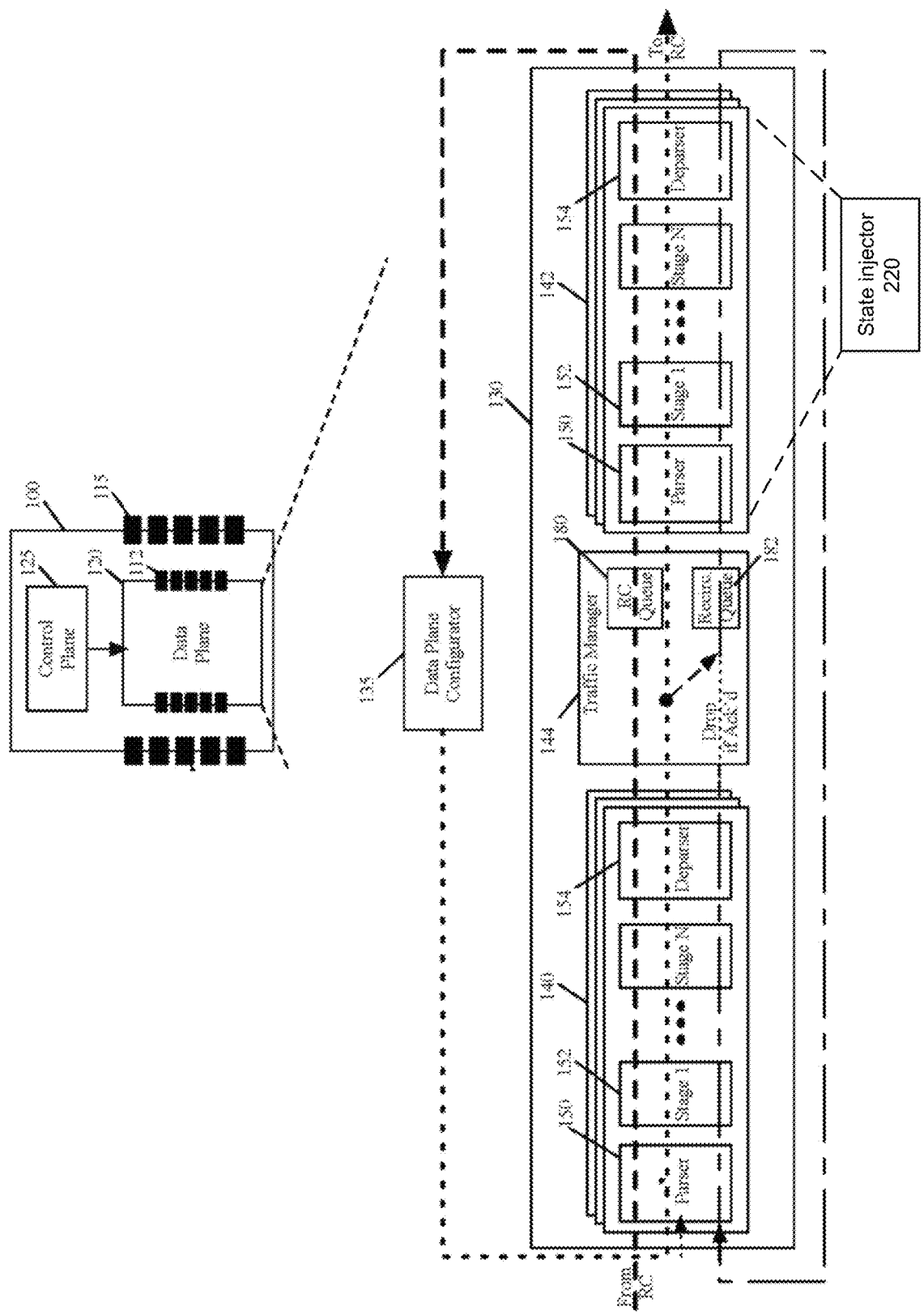

In some scenarios, when a network tester receives packets used to testing a DUT or NUT, the packets could be spurious packets as opposed to packets actually transmitted by a DUT or NUT. In some scenarios, the network tester is to test network latency but the network tester does not store every transmit timestamp of a transmitted test packet that is transmitted back to the network tester. FIG. 2C depicts a programmable packet engine, according to some embodiments. In this example, for test packets that are to be transmitted to a DUT or devices in a NUT, egress processing pipeline 142 is configured as state injector 220 to inject state information into one or more test packets prior to transmission through a port to a DUT or NUT. State information can be used to identify packets actually transmitted by a DUT or NUT or used to determine latency, among other uses.

In some examples, state injector 220 is to include one or more of the following in a packet header or payload: time stamp at packet egress, stream identifier for the packet, port identifier from which a packet egressed, destination IP address, and so forth. If portions of the packet are returned to the network tester, the injected time stamp can be compared against a receive time stamp for the returned packet (e.g., using a classifier) to determine a round-trip or network traversal latency. The latency can be stored in a queue, as described herein. In some cases, the injected stream identifier can be used to determine a source IP address in a returned packet for comparison with an expected source IP address. Other examples of state injection are described herein.

For example, one or more match action units (MAUs) of egress processing pipeline 142 can perform or implement state injector 220 by determining if a packet belongs to a stream and if so, performing an action of write time of egress or stream identifier or other state information into a header field or payload of a test packet prior to transmission. Control plane 125 can program MAUs to perform the match and action. One example match-action operation can be if a packet belongs to stream A, include a time stamp of egress or a stream identifier. Other examples of state injection are described herein.

Figure 2D:
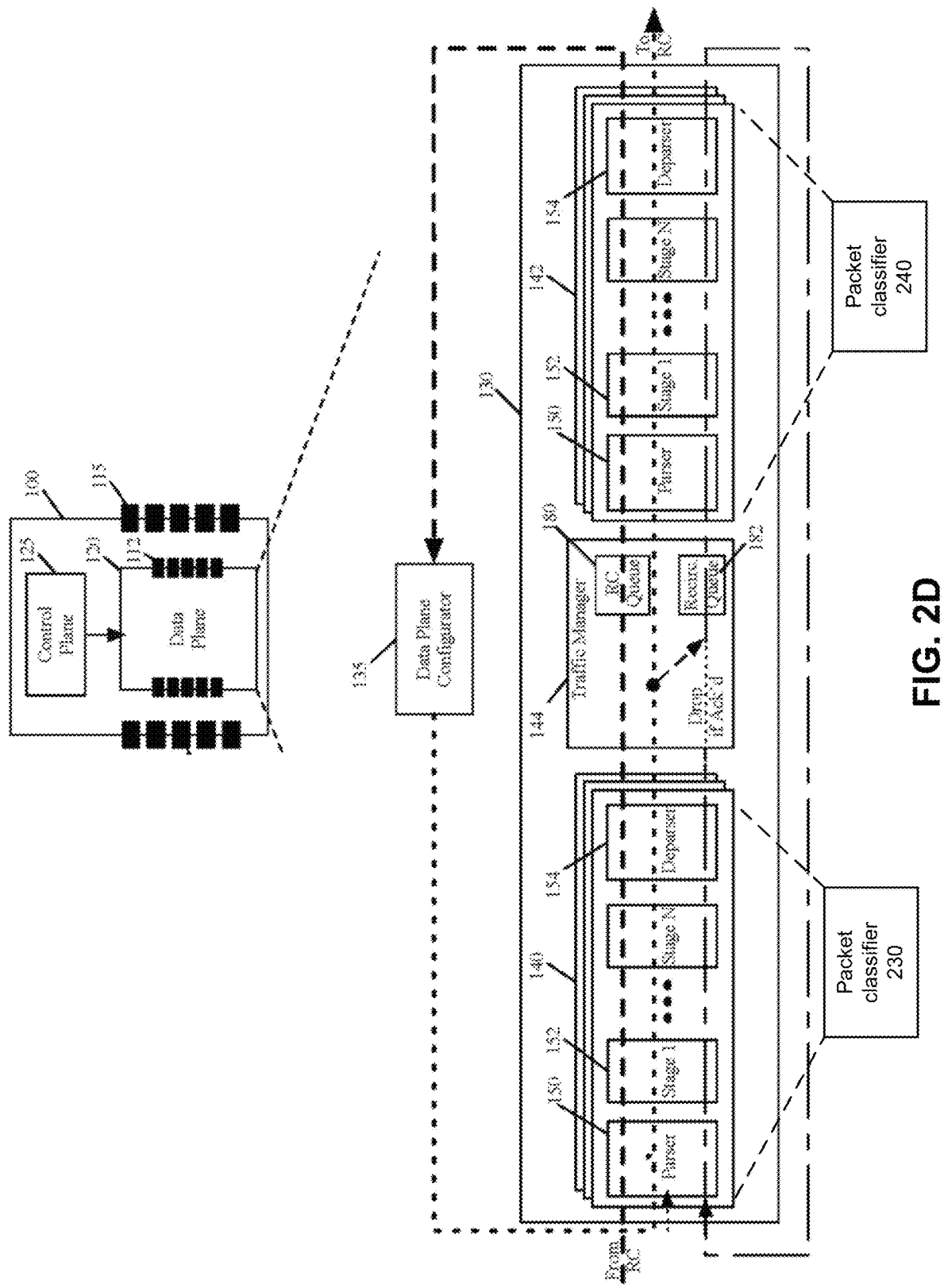

According to various embodiments, one or more ingress processing pipelines 140 can be configured as a packet classifier to monitor characteristics of received or transmitted packets. For example, FIG. 2D depicts a programmable packet engine, according to some embodiments. Control plane 125 can program MAUs to perform the match and action of packet classifier 230 or 240.

In this example, for received packets, ingress pipeline 140 can be configured as a packet classifier 230 to identify, process, and/or count packets having particular characteristics. In some examples, packet classifier 230 can be configured to identify particular header fields or protocols and count packets that (i) include specific values or ranges of values in a header field or (ii) use a specific protocol type. For example, a header field can indicate a source IP address and destination IP address. Packet classifier 230 can count a number of packets that satisfy various header field criteria. An input stream can be a series of received packets on a port along with their timestamps. In some cases, a single input stream is allocated per port. Packet classifier 230 can apply a packet filter on an input stream to identify or count packets with specified characteristics. Packet classifier 230 can apply to one or more of a packet specification and an input stream.

In some examples, packet classifier 230 can count a number of received packets or bytes in a MAC device. A counter at a MAC device can identify a number of received packets have any errors (e.g., Frame Check Sequence (FCS) error, length error, undersized packet, oversized packets). Similarly, counters at other parts of a packet process pipeline can count packets dropped with other errors, different than drops counted at the MAC. In some examples, packet classifier 230 can count a number of received packets or bytes in a receive pipeline.

For example, one or more match action units (MAUs) of egress processing pipeline 142 can perform or implement packet classifier 240 by determining if one or more header fields of a packet satisfy header field criteria and if so, performing an action of incrementing a counter indicating that the header field criteria was satisfied.

In some examples, MAUs are configured to identify a time stamp and perform an action of calculating a time stamp difference between a current time and time stamp in a received packet. An action can also include incrementing a counter that corresponds to a range of the calculated time stamp difference.

In some examples, packet classifier 240 can count a number of transmitted packets or bytes to a MAC device. A counter at a MAC device can identify a number of packets to be transmitted (e.g., frames okay, octets without error, total number of octets). In some examples, packet classifier 240 can count a number of transmitted packets or bytes from a pipeline.

Figure 3:
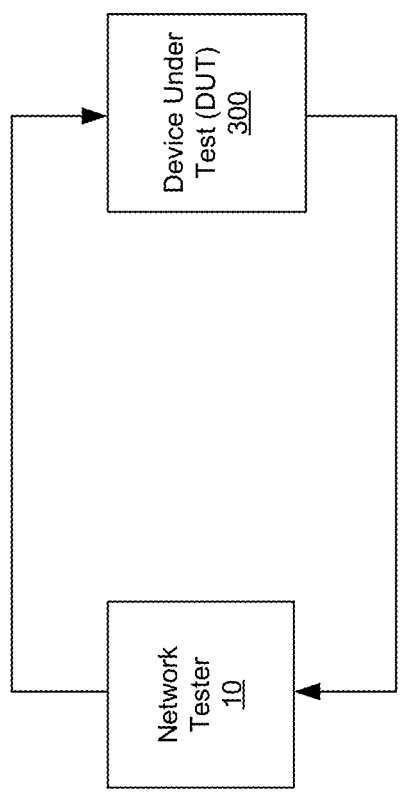
FIG. 3 illustrates a block diagram of an example network testing system in which a network tester is communicatively coupled to a DUT.

FIG. 3 illustrates a block diagram of an example network testing system in which a network tester 10 is communicatively coupled to a DUT 300. It should be appreciated that the interconnections between network tester 10 and DUT 300, e.g., physical port connections, will vary dependent on the network tests that are being carried out. Moreover, it should be appreciated that network tester 10 and DUT 300 may be communicatively coupled over a network of interconnected devices.

Network tester 10 is configured to generate traffic to provide to DUT 300 which transmits packets to network tester 10 for verification. DUT 300 can be configured to return or transmit received packets received from network tester 10 to network tester 10. Network tester 10 is configured to test the one or more of the following various network conditions: network performance (e.g., the capability of configuring ports at different speeds, packet sizes, etc.), network congestion (e.g., packets dropped and/or delayed), network latency and jitter (e.g., variance in time delay between data packets transmitted over a network), validation of network topology (e.g., load balancing), control plane verification, and so forth. Note that DUT 300 can be part of a network under test so that multiple DUTs can be tested.

Embodiments described herein provide a network tester 10 including a programmable packet engine for performing network testing operations. Embodiments described herein provide a network tester 10 including a programmable packet engine including at least one port. In some embodiment, the programmable packet engine includes four ports, where a port is configured to include multiple pipelines. For example, the port speed for each port can be one of 10G, 25G, 40G, 50G, or 100G. A pipeline associated with a port can transfer multiple streams and classifiers.

For a port of network tester 10, one or more of the following statistics can be maintained: the number of packets sent and received, the rate of packets sent and received, the number of packets dropped (e.g., by the DUT), and the number of packets received with error (e.g., failure of cyclic redundancy check (CRC), failure of checksum, etc.).

In some embodiments, network tester 10 includes a 32Q programmable packet engine including either 16 or 32 four-lane ports (or correspondingly 64 or 128 single-lane ports). Four-lane ports are named using the "[1-32]/-" format while single-lane ports use [1-32/1-4].

In some examples, an output stream is a stream that is associated with a port. A port can be associated with multiple output streams, where an output stream is associated with a single port. For instance, a user may specify to output a stream to multiple ports, or a stream might be sent by two ports in a round-robin manner. After a client defines a stream, the user should attach it to a port or ports to produce multiple output streams. Packets belonging to the same output stream can share the same unique stream identifier or be differentiated by stream identifier and port identifier.

Figure 4:
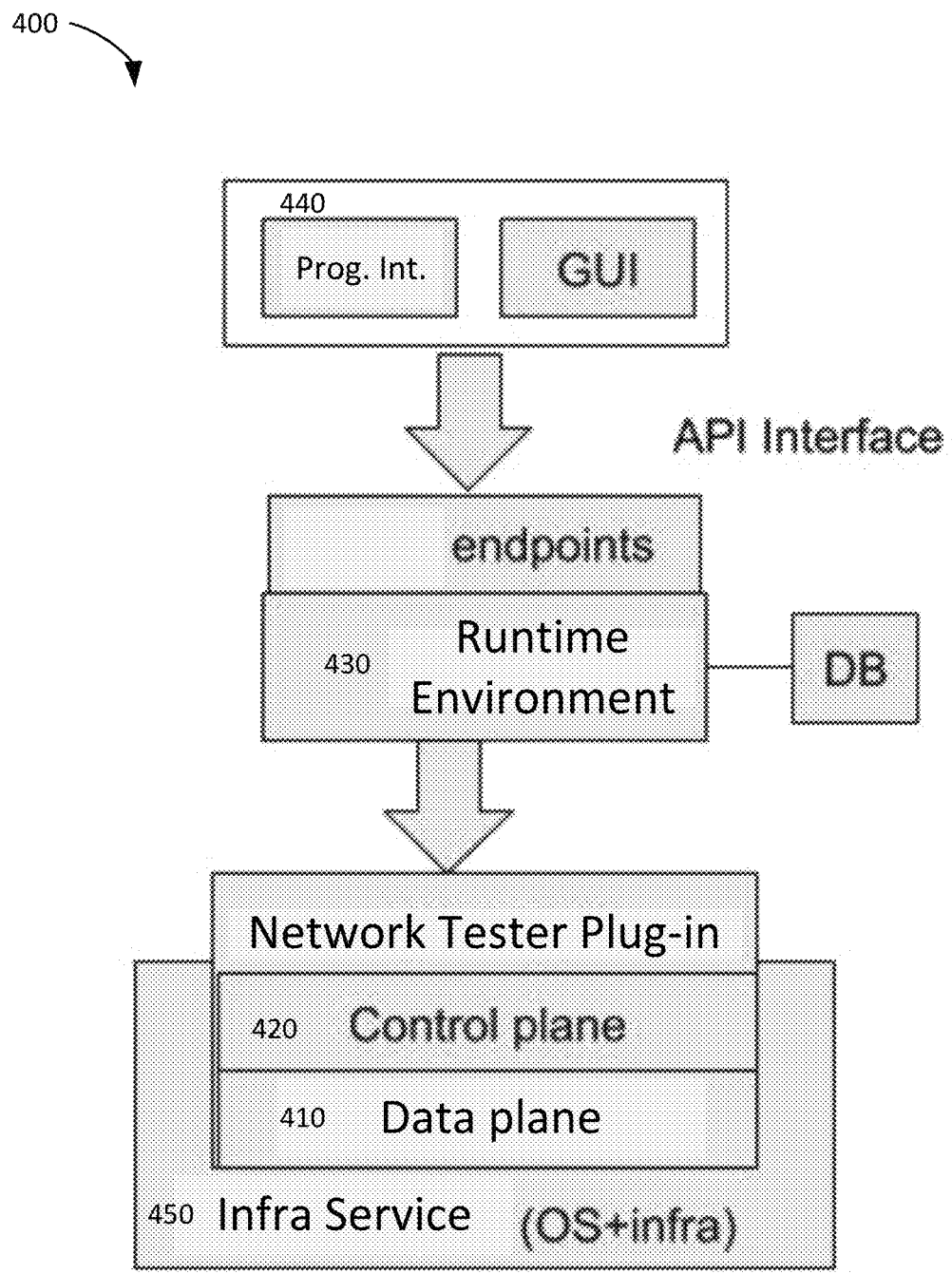
FIG. 4 illustrates the high level software system architecture for a network tester.

FIG. 4 illustrates a high level system architecture 400 for a network tester, in accordance with some embodiments. The network tester includes at least: packet engine data plane 410, network tester control plane 420, runtime environment 430, and user client 440.

Packet engine data plane 410 can perform operations specified at least by a programming language (e.g., P4 or Python) file for programming the programmable packet engine of the network tester and provides interfaces to program the programming language tables and non-programming language objects such as packet engine ports, multicast trees, CPU packet managers, etc. A network tester hosts the services to build and runs data plane 410 and provides the run-time interfaces.

Packet engine data plane 410 covers three programmable packet engine components: media access control (MAC), traffic manager (TM), and parser/deparser and match-action units (PARDE/MAU). MAC can provide for port configuration and statistic reading. TM can control multicast tree and queue shaper configuration for aggregation and transmission of test packets at a configured transmit rate. PARDE/MAU can be configured by a P4 or Python file to perform parsing and deparsing and match-actions.

Network tester control plane 420 that controls the data plane objects and reads data plane states and statistics at run-time. In some embodiments, the control and read actions are mostly triggered by requests for actions (e.g., pull model rather than push model). For example, request/response messages defined in protobuf and transported over Google remote procedure calls (gRPC) can be used to convey test configurations or read requests. Data plane 410 and control plane 420 can implement tester services such as packet replication, packet modification, state injection, packet classification or time stamp synchronization.

In some embodiments, network tester control plane 420 communicates to a driver (part of 450) through a remote procedure call system. It should be appreciated that the network tester may need to control multiple devices. A single network tester control plane 420 may control multiple network testers (e.g., using two network testers to run tests with even more ports). The network tester control plane 420 is a separate executable from the driver. In some embodiments, network tester control plane 420 directly calls native to the driver without using a remote procedure call.

Runtime environment 430 (e.g., NodeJS) provides a web backend and defines endpoint objects and provide APIs for clients to make requests. Client requests are translated to calls to network tester control plane 420. For example, a REST API can be used between interface 440 and runtime environment 430. Runtime environment 430 works as a representation layer that processes raw data from network tester control plane 420 and generates high-level information into responses back to users. Certain user states and system states can be cached in a database (DB) for performance and consistent representation of system states to multiple user clients.

Client 440 can generate requests and commands for execution on the network tester. In various embodiments, the requests and/or commands are generated and/or communicated via a programming interface (e.g., Python) or a graphical user interface (GUI). See for example, Appendix 1 for various Python instruction definitions that can be used to configure data plane 410 and control plane 420.

The network tester architecture includes software infrastructure service 450 for providing the software infrastructure for the programmable packet engine of the network tester. In accordance with various embodiments, software infrastructure service 450 accesses or includes a programming language access layer, a programmable packet engine device layer, a packet interface, etc.

Figure 5:
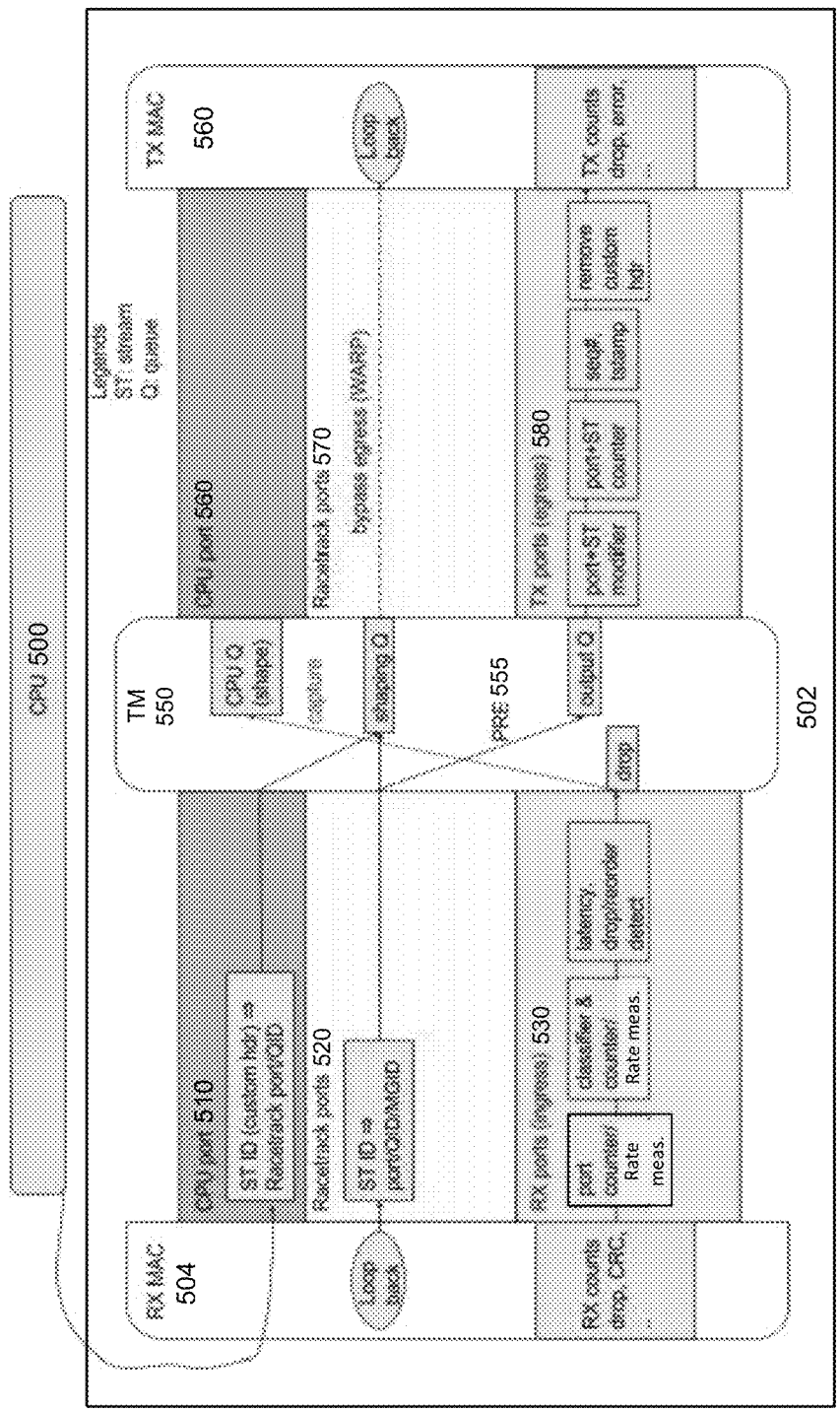
FIG. 5 illustrates an example block diagram of a network tester.

FIG. 5 illustrates an example block diagram of a network tester. CPU 500 can act as a control plane and can configure data plane 502. Data plane 502 of the network tester allocates the programmable packet engine as one or more processor ports, racetrack ports or pipelines, packet generator, packet modifier, packet classifier, state injector, ingress ports or pipelines, egress ports or pipelines.

A seed stream can include a sequence of frames or packets produced in the control plane, which is then forwarded to the data plane via CPU port 510. Within the data plane, the seed stream is used as the basis to produce one or more output streams. For example, a seed stream could be a single 1500 byte User Datagram Protocol (UDP) packet, on which the source IP address is incremented 100 times in order to produce an output stream with 100 unique flows. For instance, a seed stream might include packets with different sizes, that will be sent repeatedly by the network tester, while changing one of the header fields at some interval or between packets. A seed stream can have a few packets that will then be race-tracked and have their header fields modified in the data-plane. Seed streams can traverse the racetrack ports 520 and 570 to increase test packet count and variety.

To generate test packets, CPU 500 can inject one or more test packets through a bus into a CPU port 510 of data plane 502. CPU port 510 transfers the one or more test packets to TM 550 and the one or more test packets are stored in a queue (e.g., shaping Q). The one or more test packets enter a racetrack port 520. Note that one or more racetrack ports 520 can be associated with a racetrack pipeline. The one or more test packets loop around and are replicated using packet replication engine (PRE) 555 to copy one or more test packets. Shaping Q can be used to create gaps between packets that loop through the racetrack to set a test packet output rate.

When a stream of test packets (including copies of injected packets from the CPU) is to be egressed, the stream of test packets are copied by TM 550 to output queue (output Q). For example, a user or control plane can trigger egress of the stream to a DUT or NUT by calling a function start_tx. Packets from output Q can be egressed using TX ports (egress) 580. Port+ST modifier can modify a packets in a stream according to a packet modification configuration described herein prior to egress of the packets to a DUT or NUT. Port+ST counter can perform packet classification by counting packets or transmit rate. Seq #, tstamp can perform packet state injection by introducing a time stamp at egress.

For received packets, RX ports (ingress) 530 can be configured to perform packet classification. For example, RX ports 530 can check header fields of received packets versus expected values or within an expected range of header values, measure latency, measure packet errors or drops, perform packet reordering, or drop packets. RX ports 530 can send some packets with specific parameters to CPU 500 to inspect. As described herein, RX ports 530 can inspect and classify packets received from DUT or devices in a NUT. RX ports 530 can test if a DUT drops any packets, count packets received on a port, check if a DUT alters a packet in an expected or unexpected manner (e.g., if values in one or more header fields do not meet an expected value or range).

In some examples, a TX MAC 560 can dynamically adjust forward error correction (FEC) level on a link in response to bit error rate (BER) or the like (e.g., symbol errors, runt frames and so forth). In addition, TX MAC 560 can add erasure coding for prior packets of that flow.

[BRFT-004] Traffic Generation

Various embodiments provide for configuring a programmable packet engine to emulate a network tester and generate traffic to at least one DUT. A processor of the network tester can generate at least one template packet for use by the programmable packet engine in generating a plurality of packets. The template packet can be an arbitrary packet, and can be of any size, payload, protocol, etc. The processor can generate template packets and inject the template packet into an ingress port of the programmable packet engine for packet stream generation.

Various embodiments provide for traffic generation at a programmable packet engine configured to perform network testing. A processor of the network tester generates at least one template packet for use by the programmable packet engine. The programmable packet engine injects packets into at least one racetrack port (or other port) of the programmable packet engine. Packets loopback within the at least one racetrack port to generate racetrack streams. Packets from the at least one racetrack port are copied into an output port to generate a packet stream thereby to increase a number of test packets available to transmit (and potentially modify before transmission). The packet stream is transmitted through an egress pipeline of the output port to a DUT or NUT.

In some embodiments, template packets are received at a port of the programmable packet engine configured to receive template packets from the processor, referred to herein as a "processor port" or CPU port (e.g., FIG. 5). It should be appreciated that the programmable packet engine can include any number of processor ports. Template packets from the processor port are forwarded to a port of the programmable packet engine that is configured to loopback to the ingress port on egress, referred to herein as a "racetrack" port. It should be appreciated that the programmable packet engine can include any number of racetrack ports, and that the number of racetrack ports can by subject to dynamic allocation.

In some embodiments, the number of packets injected by a processor into the programmable packet engine is large enough to guarantee that the number of packets multiplied by the packet size is not less than the stream rate multiplied times the end-to-end (e2e) pipeline delay.

The racetrack streams continuously loopback through ingress-egress of the racetrack port to increase a number and/or variety of test packets. In some embodiments, the racetrack ports are programmed such that packets bypass the egress pipeline of the racetrack port so as to not to consume egress MAU and parser and deparser (PARDE) cycles. Using the queuing system of the programmable packet engine, packets are injected into a racetrack port in any order (e.g., random order or a particular sequence). The sequence of packets in the racetrack port can be known and tracked by the programmable packet engine. The ordering of the packet in a particular sequence can be achieved by pre-loading a stopped racetrack queue with packets in the particular sequence, and the releasing the queue to start the racetrack. The packets can traverse the racetrack in the racetrack port at line rate or at another desired rate, which can be achieved by using a queue shaper (shaping Q of FIG. 5) at traffic manager or a meter at match action unit (MAU). The programmable packet engine and/or processor of the network tester include logic regarding the ordering of the sequence of packets and tracks the sequence of packets in the racetrack port.

In some embodiments, a buffer (e.g., within or used by a traffic manager) stores packets per stream (e.g., thousands of packets), with the packets having varying sizes. For example, the buffer can store multitudes of packets per stream, each packet having a different size, to form a stream with various packet sizes. Packet streams can be transmitted to a DUT or NUT through the egress pipeline of the programmable packet engine by copying packets from the racetrack port to an egress pipeline and egressing the packets through an output port.

Packets from the racetrack port can be copied into one or more output ports of the programmable packet engine to generate output streams. In some embodiments, the packets are selectively copied into egress pipelines of the output ports to generate a desired packet sequence. The programmable packet engine and/or processor of the network tester include logic regarding the ordering of the sequence of packets and utilizes this logic to generate streams with a desired sequence of packets. A packet sequence can be selected when packets are copied to the output port. In some embodiments, the racetrack packets are copied by a packet replication engine (PRE) 555 (FIG. 5) into the egress pipeline of an output port.

A packet specification can be a collection of packet attributes. An attribute is the packet header, which includes one or more protocol headers, which in turn includes one or more header fields. Another attribute is packet length. A stream can have a single packet specification that defines the format of its packets. The set of protocol headers and the packet length may be invariant of the packet specification, meaning that a lambda operation (below) does not alter those.

Embodiments described herein also provide a network tester including a programmable packet engine that controls packet stream transmission rate. In some embodiments, a traffic manager queue shaper at the racetrack ports is used to control the rate of each test packet transmission stream. In some embodiments, template packets received from the processor are assigned a stream identifier (ST ID), allowing an ingress MAU to match and select the racetrack port as well as the proper queue whose shaping rate and burst size are configured to meet the stream's requirements. It should be appreciated that up to all available streams of the programmable packet engine can employ fine-grained rate control. If some streams do not use fine-grained control of rate and burst behaviors, coarse-grained control can be employed for such streams by setting the number of packets injected by processor. Streams can be multiplexed into queue, so long as their aggregate rate does not exceed the queue rate.

In other embodiments, an MAU meter of the port is used to provide fine-grain rate control. Comparatively, using the MAU meter consumes extra bandwidth as it has to drop packets and the seed stream needs to racetrack at higher rate than its target transmission rate. The MAU meter has an advantage in terms of the number of rate-controlled streams that can be supported, since the MAU can create on the order of 10,000s of meters (or more or less) (e.g., using MAU resources). Such an embodiment can be used at least where a large number of streams are to be fine-grained rate controlled and the application does not require full line-rate throughput from transmission streams aggregate, and operates as a hybrid of shaper and meter. A bin-packing scheme takes into consideration the extra bandwidth needed for meter-controlled streams.

Providing a desired per-stream rates for a set of concurrently active streams incurs a resource allocation/accounting usage. A programmable packet engine has multiple dimensions of resources. In the case of using a shaper for rate control, a shaper is a resource available at each egress queue. A port has a limited number of queues (hence the same number of traffic shapers). A traffic manager packet buffer is a device-wide resource pool but storing a sequence of packets in a queue consumes traffic manager packet buffer space. One or more MAU pipelines has a limited Packet-Per-Second processing bandwidth. When loading a stream onto a racetrack port and sending out to a traffic output port (connected to the DUT), the stream consumes the packet per second (PPS) bandwidth of a pipe that each port belongs to. Finally, the sum of stream rates cannot exceed the Bits-Per-Second (BPS) bandwidth of a port (regardless of racetrack port or output port connected to DUT).

A slice of a resource dimension can be allocated or accounted for sending a stream of desired packets (e.g., of a particular sequence) at a desired target rate without contention/interference between the concurrent streams. Instead of slicing, a certain type of resource (such as a traffic manager packet buffer) can be statistically shared based on its maximum resource consumption model.

When a new stream is requested by a user to send out to a particular output port, the control plane software running on the processor or an external controller finds a racetrack port and queue that satisfies the resource demands by the new stream while avoiding any negative impact on the on-going streams that have been already admitted. A variant of multi-dimensional knapsack algorithm (e.g., Martello, "Algorithms for Knapsack Problems," North-Holland Mathematics Studies (1987)) may be used to increase the number of streams that the system can sustain while meeting the rate requirements, where the dimensions are the resource dimensions mentioned above.

If there is no port/queue/resource available to secure the new request and the existing streams, the new stream request is not admitted. The control plane may compute a re-shuffling of existing streams that re-allocates some of the existing streams to different racetrack pipes/ports/queues for further optimizations.

In some embodiments, the programmable packet engine may include 32×100 G ports split among two internal pipes and two external pipes, where the racetrack ports are apportioned to the internal pipes and the external pipes are used for transmitting and receiving packets. In some embodiments, the programmable packet engine includes 64 ports split among 4 pipes, where half ports of each pipe are exposed for outputting packets, utilizing all 4 pipes for both recirculation and sending traffic. However, it should be appreciated that number of pipes, ports, and port allocations can vary across different programmable packet engines, of which the described pipes, ports, and port allocations are examples.

A set of pipelines and/or ports and hardware resources can be pre-allocated and used as a pool of racetracks to allocate to each stream request. Another implementation may not have a predefined allocation of racetrack ports or output ports; but dynamically select a port out of the entire system ports to be a racetrack. This approach can optimize resource usages and the admission of user requests.

Figure 6:
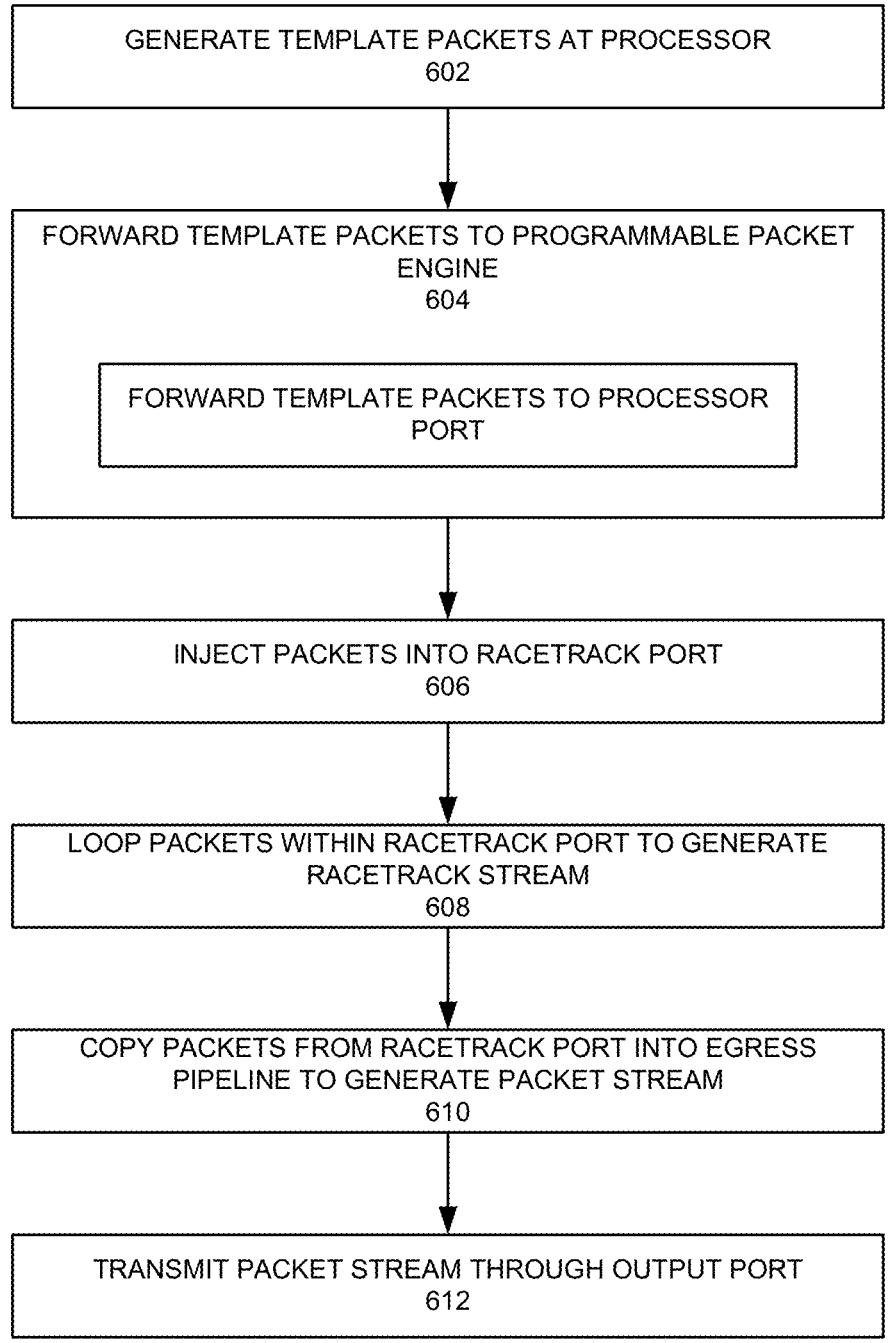
FIGS. 6-9 illustrate various processes.

FIG. 6 illustrates a flow chart of an example method for modifying traffic at a network tester using a programmable packet engine, according to embodiments. At 602, template packets are generated at processor. At 604, the template packets are provided to a programmable packet engine. For example, the template packets can be received through a processor port of the network tester. At 606, template packets are injected into racetrack port. At 608, packets are looped within racetrack port to generate racetrack stream. For example, during looping, packets can be copied to increase a number of available test packets. In addition, or alternative to the process providing template packets, based on configuration by a control plane, a packet generator can generator one or more packets and inject the packets into the racetrack stream. At 610, packets from the racetrack port are copied into an egress pipeline to generate packet stream. For example, packets from the racetrack ports can be provided to the egress pipeline when a number of packets is high enough to achieve a desired output transmit rate. At 612, the packet stream is transmitted through an output port to a DUT or NUT. Note that modifications to the packet stream can be made prior to transmission through an output port to a DUT or NUT in accordance with embodiments described herein.

[BRFT-005] Traffic Modification

Various embodiments provide a network tester that is configured to perform packet modification at an egress pipeline of a programmable packet engine. A packet stream can be received at an egress pipeline of an output port of the programmable packet engine. The output port (e.g., egress pipeline) can include an egress pipeline configured as a packet modifier. The packet modifier modifies packets to generate test packets according to a configuration specified by a control plane or a user. The packet stream including modified packets can be processed (e.g., packet counting or state insertion) and generated by an egress pipeline of the output port and transmitted through the output port.

Various embodiments provide an egress pipeline of a programmable packet engine that emulates a network tester or group or devices. Packet streams are received at an egress pipeline of an output port of the programmable packet engine. For example, packet streams can be generated by techniques described at least with respect to FIG. 6. In some examples, the egress pipeline performs at least one modification to modify packets of the packet streams. In some architectures, a pipeline including a packet modifier supports multiple ports so that multiple ports share the packet modifier of the pipeline. For example, modifying a packet can change sequential packets within a stream sent to a different devices within a NUT.

In some embodiments, a stream is assigned an identifier (e.g., "stream identifier" or "ST ID") upon receipt at the programmable packet engine. For example, when a processor forwards a sequence of packets into the programmable packet engine, a stream identifier is assigned to a stream. When a stream is copied to the output port (e.g., from a racetrack port or pipeline), the stream is assigned an output stream identifier, where the output stream identifier is a combination of the stream identifier and an output port identifier of the output port to which the stream is copied. For example, if a stream is copied to two output ports, the output stream identifiers are different as they are the combination of the stream identifier and the particular output port identifier.

A stream can be a user-defined packet stream to send to a DUT or NUT to test operation of the DUT or NUT. An output stream can be identified using a stream and one or more ports. A user or control plane can tie a stream to particular one or more outputs ports. In some cases, streams are synchronized at output from the one or more output ports. In some embodiments, a client can create a modifier for an output port (e.g., stream-port combination). For a given stream-port combination, one or more modifiers can be created for one or more fields. A client can specify a field when creating a modifier. A field can be a part of a network protocol header (e.g., Ethernet, IPv4, IPv6, TCP, UDP, VLAN tags, Internet Control Message Protocol (ICMP), address resolution protocol (ARP)). A packet modifier can modify the field according to the modification scheme.

The packet modifier (e.g., egress pipeline) can be configured to modify packets of the stream in the output port. In some embodiments, the packet modifier is configured using a programmable code block, segment, or file (e.g., a P4 code block). The packet modifier can modify a particular field of the packet (e.g., source IP, destination IP, destination port, etc.) using an egress pipeline configured as a state machine. The state machine can be applied to one or more output streams, where the state machine is identified by the combination of the stream identifier and the output port identifier (e.g., output stream identifier). Input to the state machine can be an internal state and information in the packet that identifies the modification to be made to the packet.

A client can configure the packet modifier to modify certain header fields to vary the field value in outgoing packets. For example, a configuration file (e.g., Python or P4) can configure packet modification operations. It should be appreciated that packets of each output stream can be modified differently. For example, the packet modifier can be configured to increment a value in a field of packets of a packet stream, e.g., from a minimum value to a maximum value. In some embodiments, the modifier takes a tuple of [start, step, end] to increment or decrement the field value from the start to the end by the step size. In some embodiments, a modifier may take a repeat count parameter to apply the same value to the number of packets before changing the field value. When multiple modifiers are specified, they may be executed in parallel. In other embodiments, hierarchical execution of modifiers (e.g., nested loops, one loop for each modifier) is performed.

A client can supply a function describing packet modification and that function is then converted (compiled) into a set of hardware actions that implement the function. In some embodiments, the network tester is configured to provide programmable editing of the modifiers. For example, a framework for editing/modifying packets can be specified by a client. Based on the stream identifier and the output port identifier, a packet modifier can apply the particular modification to packets in a stream. The modification can be a function of the internal state of a packet, packet header contents, and metadata (e.g., a timestamp). In some embodiments, the modification is a packet size modification (e.g., dropping a portion of the body of the packet (e.g., truncating the payload). In such embodiments, the current packet size can be an input to the modifier.

In some embodiments, a user or control plane can configure modification using a lambda function on the packets. For example, a lambda operation can increment or decrement the value of a field of the packet. A set of fields could be changed in the packet based on a predefined set of operations (e.g., no operation, increment, decrement, and set) along with minimum and maximum values, step increment/decrement and repeat count. For example, the fields could be IP source and IP destination addresses and the L4 receive and transmit ports. Lambda can be applied based on packet specification but may not alter a set of protocol headers and the packet length.

Figure 7:
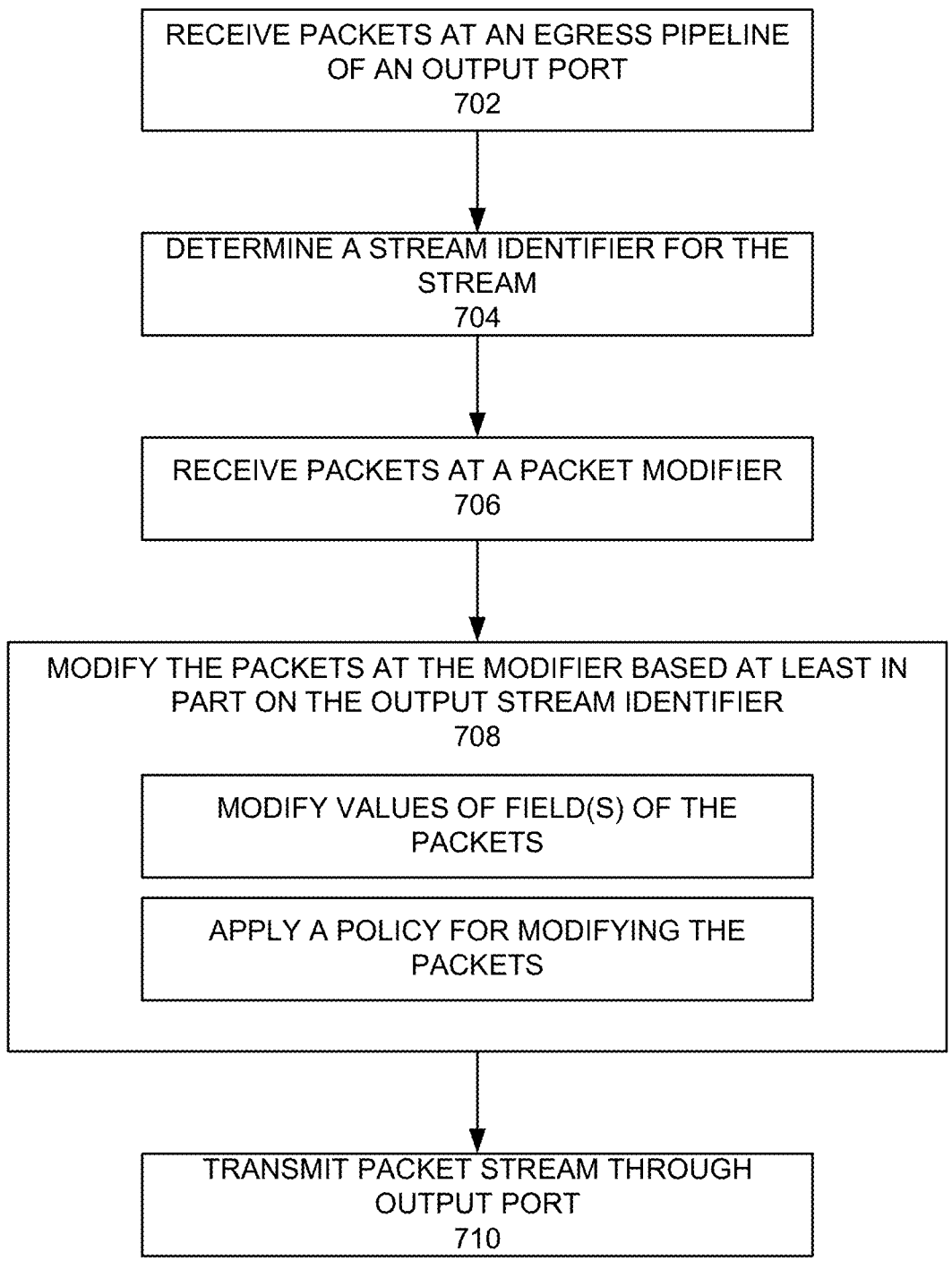

FIG. 7 depicts a process to use a configured egress pipeline to modify packets prior to transmission to a DUT or devices in a NUT. At 702, packets are received at an egress pipeline of an output port. The packets can be generated using traffic generation techniques described herein from a template packet and using packet copying and race tracking. At 704, an output stream identifier is determined for a stream that includes the packets. A stream identifier can be set by a client. A stream identifier can be a combination of a stream identifier and an output port identifier of the output port to which the stream is copied. In some examples, if a stream is copied to two output ports, the output stream identifiers are different as they are the combination of the stream identifier and the particular output port identifier.

At 706, packets are received at a packet modifier of the egress pipeline. At 708, the packet modifier modifies the packets based at least in part on a configuration specified for the stream identifier. For example, various fields of a packet can be modified according to a pattern or configuration specified by a user to test various scenarios. Packet modification can be used to vary test traffic experienced at a DUT or NUT to test responses thereto. A policy can be applied to modify packet headers according to a prescribed manner (e.g., lambda operation or nested loops of packet header modification). At 710, the packet stream is transmitted through an output port to a DUT or devices in a NUT. In some examples, modification of the packet stream can allow the network tester to emulate multiple network devices.

[BRFT-006] Stateful Processing

Embodiments herein include a network tester configured to perform stateful processing and account for received packets using a programmable packet engine. A packet stream can be received at an egress pipeline of an output port of the programmable packet engine. The egress pipeline can be configured to inject state information into the packets. The packet stream, including the packets, can include state information. For example, state information can include a stream identifier, time stamp, or other content. A DUT or device in a NUT can receive at least some of the packets and send one or more packets including the state information back to the network tester for receipt at an input port of the programmable packet engine. The programmable packet engine can be configured to monitor for state information in received packets. In some embodiments, analytics are performed using the state information. In some examples, the DUT or device in a NUT can inject state information for transmission to the network tester such as a time stamp, queue fullness level (e.g., ingress or egress), indication of use of an updated packet routing map, and other information and such information can be analyzed by the programmable packet engine.

Embodiments described herein can provide a network tester that includes a programmable packet engine including at least one port. In some embodiments, the programmable packet engine includes four ports, where a port is configured to receive packets from one or multiple pipelines. For example, a port speed for a port can be one of 10 Gbps, 25 Gbps, 40 Gbps, 50 Gbps, 100 Gbps, or other speeds. Multiple streams and classifiers can be received or transmitted through a port. For a port, one or more of the following statistics can be maintained, including one or more of: the number of packets sent or received, the rate of packets sent or received, the number of packets dropped (e.g., by the device under test (DUT)), the number of packets received with error (e.g., failure of cyclic redundancy check (CRC), Checksum), packet drops at MAC interface, packet drops at a pipeline, packet latency, or packet reorder occurrence.

Embodiments herein describe a network tester configured to perform stateful processing and accounting of received packets using a programmable packet engine. The network tester can provide for traffic generation at a programmable packet engine. Upon egress of the packet from the network tester for transmission to a DUT, state can be embedded into a packet such that various comparison operations can be performed upon return of the packet to the network tester. In some embodiments, the state is stored in both the packet and in a memory device of the network tester.

Prior to transmitting test packets, the network tester device can add "state" (e.g., a timestamp, a header, specific values for some header fields) to the packets. On the receiving side, the network tester device can monitor and count whether the received packets have the required properties, or extracts state from them (e.g., a timestamp) and performs accounting (e.g., how many packets where received at a port versus number of expected packets to be received from the DUT or NUT).

The programmable network switch can include multiple ingress processing pipelines and egress processing pipelines. State information can be injected into packets exiting the network tester at a state injector of the egress processing pipelines, also referred to herein as "ports." In some embodiments, the state information injected into the packets is stored within the network tester, along with information identifying the packets corresponding to the injected state information.

Upon receiving a packet at the ingress processing pipeline, the state information can be extracted. The extracted state information can also be stored within the network tester. The injected state information and the extracted state information can be utilized to perform various network analytics, e.g., to monitor performance of the network fabric. The programmable network switch can be configured to share state across multiple ports/pipelines. A set of network testers may be configured to share state across multiple tester devices and their programmable packet engines.

For example, timestamps can be inserted into packets upon transmission from the network tester. The timestamp can be maintained in the packet and upon return of the packet to the network tester, a latency comparison can be performed between the timestamp maintained in the packet and the time stamp. The timestamps for the packets can be maintained locally in the network tester and reported to the processor or remote controller based on a particular event/condition or periodically.

The insertion of state information into packets transmitted to a DUT and local storage of the timestamps allows for enhanced analytics. For example, the network tester can record a number of packets in flight, and can constantly keep track of packets in flight. In some embodiments, histograms of latencies can be generated based on the state information (e.g., transmit time stamp, receive time stamp, or round-trip latency).

Embodiments described herein provide for evaluating a DUT or network performance, e.g., various benchmarking methodologies governed by various standards committees. In some embodiments, the network tester may inject state information into a packet prior to transmission to evaluate network performance. For example, state information in packets can track how many hops a packet traveled through a network and then back to the network tester. How many hops a packet traveled through a network and then back to the network tester may be determined by examining the time-to-live (TTL) field of a packet.

In some embodiments, the state information injected into the packets provides for targeting polarization in the network fabric, e.g., to determine a cause of the network polarization. Network polarization can be the result of poor load balancing, directing traffic unevenly over nodes of the network fabric. If a network node uses a particular calculation in directing traffic to the next node such that all traffic is directed to a particular node, there is a failure in load balancing.

Figure 8:
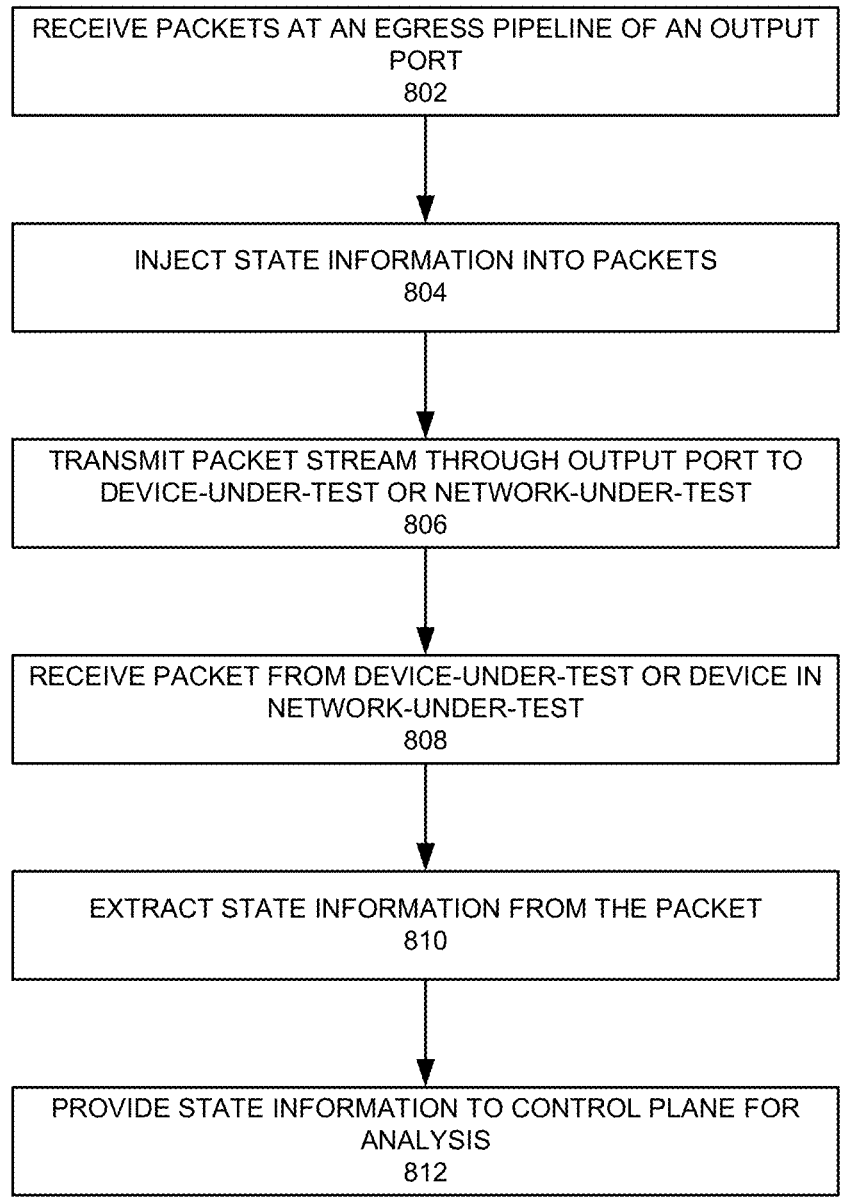

FIG. 8 depicts a process to use state information in a packet to analyze a DUT or network through multiple network elements. At 802, packets are received at an egress pipeline of an output port. For example, the packets can be generated using a traffic generator and packet modifier described herein. At 804, state information is injected into at least some of the packets. State information can include a time stamp at transmit, stream identifier, and other information described herein. At 806, a packet stream can be transmitted through the output port to a DUT or devices in a NUT.

At 808, packets can be received at an ingress port of an input port of the network tester. For example, the packet can be received from a DUT or device in a NUT. At 810, state information can be extracted from the packet. For example, a classifier can be used to identify state information in the packet and identify an occurrence of the state information. The classifier can perform processing involving the state information such as round-trip latency determination, number-of-hops traversed, network polarization, and other examples. At 812, the state information can be provided to a control plane for analysis. Various examples of state information provided to the control plane are described herein.

[BRFT-007] Timestamp Synchronization Across Multiple Devices

Embodiments described herein provide for synchronization of timestamps across multiple devices using a timestamp source. A remote controller can send a timestamp value to a plurality of network devices. The plurality of network devices store the timestamp value in a register. The remote controller provides a load signal to the plurality of devices. Responsive to receiving the load signal, the plurality of device load the timestamp value into a timestamp counter.

Embodiments described herein provide for the time synchronization of packet operations across multiple programmable packet engines. A programmable packet engine includes a timestamp counter (e.g., timestamp counter 24 of FIG. 1B) for providing timestamp information and a register (e.g., register 22 of FIG. 1B) communicatively coupled to the timestamp counter. The registers of the programmable packet engine are communicatively coupled to a remote controller. The remote controller is configured to provide a timestamp value into the register. Upon receipt of a load signal from the remote controller, where the load signal is sent to each programmable packet engine at the same moment, one or more programmable packet engines load the timestamp value from the register into the timestamp counter, overwriting the current timestamp counter value. In this way, the timestamp counter for each programmable packet engine is synchronized to the same counter value at the same moment.

Timestamp synchronization described herein can be performed for any type of electronic device that utilizes timestamps and timestamp synchronization, and is not intended to be limited to use within multiple programmable packet engines. For example, use within many other types of electronic devices is contemplated, including, without limitation: computers, servers, cellular telephones, tablet computers, etc.

Various embodiments can use techniques described in IEEE 1588-2008 Precision Time Protocol (PTP) to synchronize time between different nodes on an Ethernet network. The IEEE 1588-2008 protocol depends on exchange of time-stamped frames between a device that uses a timing master clock and another device that uses a timing receiver clock. In some examples, real-time transport protocol (RTP) described at least in RFC 3550 can be used to synchronize time stamps between devices. Propagation time of a time stamp can be considered in setting a time stamp or adjusting a received time stamp. For example, a network tester can determine a propagation delay from a remote controller and adjust the received time stamp by a time stamp count of the propagation delay to move the time stamp value backward in time by the propagation delay.

Various embodiments can configure programmable packet engines as a network tester for packet operations such as packet generation, replication, modification, and transmission. Embodiments described herein provide for the synchronization of packet operations by utilizing programmable packet engines including registers coupled to the timestamp counter, as described herein.

In some embodiments, a network tester is communicatively coupled to a remote controller. The remote controller can be connected to the network tester using a network, bus, interface, interconnect or any medium. Some registers of a programmable packet engine can be updated by the remote controller. In some embodiments, the programmable packet engines are communicatively coupled to the remote controller over a one wire interface. The one wire interface may be a low level mechanism, e.g., a load and increment mechanism. A processor of the remote controller, e.g., an FPGA, controls the timestamp counter of each programmable packet engine over the one wire interface.

The remote controller writes a timestamp value into each register of the programmable packet engines. A load signal is generated at the remote controller and transmitted to the programmable packet engines. For example, where a one wire interface is used, the load signal can be a stretched out clock signal. Upon receipt of the load signal, a programmable packet engine load the timestamp value from the register into the timestamp counter, resulting in the synchronization of the timestamp counters across the multiple network testers. Synchronization of the timestamp counters then allows for synchronized actions such as synchronized generation of traffic. The time synchronization also for synchronizing time stamping packet transmit or receive times across multiple network testers. Network testers can use the synchronized time stamps to determine latency measurements for transmitted and received packets.

Figure 9:
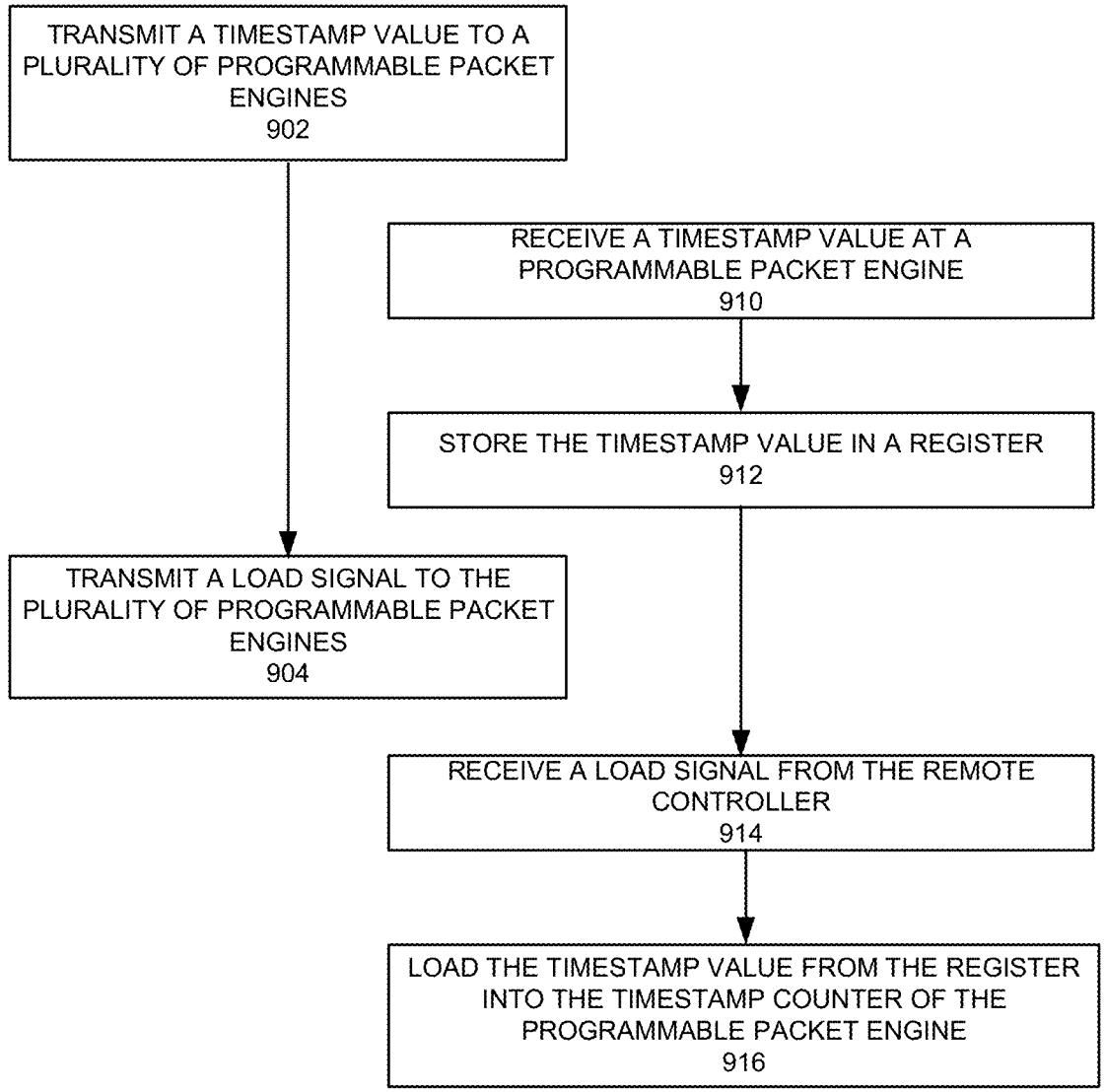

FIG. 9 depicts an example process used to generate a time stamp at a remote controller. At 902, a remote controller transmits a timestamp value to a plurality of programmable packet engines. A wire or other connection can be used to provide the timestamp value to the plurality of programmable packet engines. For example, the connection can be a network, fabric, bus, or interconnect. At 904, a remote controller transmits a load signal to the plurality of programmable packet engines. Likewise, a wire or other connection can be used to provide the load signal to the plurality of programmable packet engines.

At 910, a network tester receives a timestamp value at a programmable packet engine and at 912, the network tester stores time stamp value in a register. At 914, the network tester receives a load signal from the remote controller. At 916, the network tester loads a time stamp value into a time stamp counter. Thereafter, the network tester can continuously update its time stamp counter by increasing the time stamp counter from the received time stamp value. The network tester can use the time stamp counter to inject time stamp values into transmitted packets as state information or to generate a time stamp to identify time of packet receipt. As described herein, the time stamp used to time of packet receipt can be compared against a time stamp in the packet to determine round-trip latency.

[BRFT-008] Packet Classification

Embodiments described herein provide packet classification in the data plane of a packet forwarding device. In some embodiments, the packet forwarding device is a programmable packet forward device (e.g., a programmable network switch or a programmable packet engine). In other embodiments, the packet forwarding device is a fixed-function device.

A programmable packet forward device is configured as a classifier to select a set of packets based on packet attributes (e.g., header fields, packet size, stream ID). It should be appreciated that other packet attributes may be used. A classifier may be performed on the both transmit and receive sides to gather statistics for packets that share some common characteristic at both transmit (TX) and receive (RX) ends. A classifier can be used for statistics gathering or packet capture. In some embodiments, the classifier supports one or more rule per header field that can be a range match. In some embodiments, a classifier can be associated with at least one RX port, supports n tuple (where n is any integer), and a rule has a priority level. For example, a 5 tuple can be a source IP address, source port number, destination IP address, destination port number and the protocol in use.

A packet may be a match for multiple rules whereby several classifiers may overlap in the range of values they cover. User or control plane can assign a priority to different classifiers and if a packet matches multiple classifiers, a highest priority matchings (or group of higher priority matchings) can be applied and reported.

A packet trace can be a sequence of one or more packets in a serialized format. A classifier can identify a packet trace and save the packet trace to memory. A packet trace could be supplied by a control plane to create a stream.

A classifier can be configured to associate an action to send matching RX packets to a CPU port. Based on an RX packet satisfying the classifier rule, a packet classifier may store RX packet in a file as long as the rate is acceptable. Packets classified by packet classifier can be filtered (e.g., in real-time by CPU) based on a user defined configuration and logged onto a configured sink (e.g., formatted log file, summarized to a remote collector (count) or a pcap file). Location of the files can be configured along with the file names. In some embodiments, due to the limited capture rate, resource management and/or monitoring is used, e.g., generating a warning if there is an on-going capture.

For example, RX packets can be redirected to a CPU through one of three channels (e.g., 10 Gbps port #1, 10 Gbps port #2, or a PCIe interface). It should be appreciated that based on the choice of capture channel, the expected throughput of capture could vary.

A classifier can be configured as a counter to count a number of RX or TX packets and the number of bytes received and/or transmitted. A classifier rule can be associated with a counter to count a particular flow. For example, a classifier may count RX packets from a DUT. However, the classifier may be configured to filter out rogue or unexpected packets received from a DUT (e.g., link layer discovery protocol (LLDP)) in RX packet counting. A TX or RX counter can be used by the network tester control plane to compute TX/RX rates. In some embodiments, traffic manager (TM) and parser and deparser (PARDE) counters can be provided for debugging purposes.

For example, a data plane of the programmable packet engine of the network tester can be configured to collect counters from a match action unit (MAU) or media access control (MAC). For example, an MAU can count TX or RX packets per-port or per-stream identifier. A MAU can count a number of out-of-order sequence (SEQ) RX packets. A MAC can count transmitted packets, received packets, received packets with CRC or checksum errors, number of packets drops at transmit or receive.

The following is an example scenario. A network tester can send 1000 TCP flows using 512 byte packets with increasing dst_port numbers to the DUT at the rate of 10 Gbps on each port and expect the DUT to send packets back to a single port at 100 Gbps on the network tester. For example, in a test configuration file, a stream content and rate can be defined, with one modifier (+1 TCP dst_port) for application by traffic generator and packet modifier prior to transmission on 16 output ports, with a transmit rate of 10 Gbps, resulting in 16 output streams. In addition, in the test configuration file, the network tester can be configured to apply 1000 classifiers for the 1000 TCP flows to a single input stream on one port and generate statistics from the output of the classifiers. In this example, the test configuration file specifies that classifiers are to determine a round trip time for the 1000 TCP flows. For example, to capture all the packets with dst_port<10, the user can define a new classifier to create a packet capture.

The network tester can generate test packets in a manner described herein and also modify packets prior to transmission to achieve the test packet scenario. Moreover, the network tester can inject state information into transmitted test packets such as but not limited to stream identifiers or time stamp at transmission. Based on data generated by the classifiers, the network tester can provide a report on the statistics of the received stream. In this example, the classifiers compare time stamp at packet receipt against time stamp stored as state in the transmitted packets to determine a latency value and provide latency distribution spans for the 1000 TCP flows (e.g., count of packets with latency of <10 milliseconds, between 10 milliseconds and 30 millisecond, and above 30 milliseconds).

For receive-side and transmit-side verification, a packet classifier of the network tester uses a table of match-action entries, with an entry matching on a set of header fields, identifying packets that matches on the entry (e.g., fits a value or within a range of values) and applies an action on those packets. The actions applied can be, for example, receive or transmit packet and byte counting, sending the packets to the processor for further processing or stateful analysis in the packet engine data plane, determining difference between time stamp in a received packet and a current time stamp, determining deviations from expected values in a header field of a packet. The table of match-action entries can be configured to perform a classifier or classifier table.

However, implementation of classifiers can be subject to hardware architectural and limitations on physical space. For instance, it may be difficult to fit a classifier of a required size into the data plane. The size of a classifier is defined in two dimensions: width and height. The width is defined as the length of the concatenated match fields and additional metadata. For example, in a network tester, a large set of protocol fields are required to be accessed to generate and verify various test traffic, hence large classifier width is used, and the width can often exceed the hardware limitations. The depth is defined as a number of entries to place in the data plane memory (e.g., ternary content-addressable memory (TCAM) and/or static random access memory (SRAM). The depth can be limited by the total memory size. In some embodiments, a wider table consumes more memory per entry, which decreases the depth.

In hardware, there can be limitations on how many fields that can be checked at once. To check more headers, fields can be split into groups, and searched separately in each group. In accordance with some embodiments, schema for increasing available depth of a classifier are provided. In general, various embodiments utilize multiple tables, where a table may be composed of a group of memory blocks (e.g., TCAM and/or SRAM blocks). In some embodiments, a mutually-exclusive division of depth of the classifier is provided. For example, multiple match tables can be utilized, where a first table is utilized for performing ternary matches or range matches, and a second table is utilized for performing exact matches. For instance, in an example use case, the first table is deployed in TCAM for matching over ternary fields or ranges and the second table is deployed in SRAM for determining exact matches. As such, the first table covers normal functionality (e.g., ternary matching or range matching) and the second table performs exact matches (e.g., exact match on an n-tuple). If there is a match in all tables, an action is identified to perform. Various example actions are described herein. Various embodiments can increase a number of available entries in the classifier. It should be appreciated that there can be more than two tables, e.g., different table can cover different types of matching, or more than one table can be utilized for performing the same type of matching.

In some embodiments, parallel tables with overlap of the classifier match space are provided. Two or more tables can be used, where matches can potentially occur in any number of tables. This embodiment allows increasing the total size of the classifier, and also allows for the use of overlapping classifiers. This embodiment also allows for increasing the total number of classifiers, while also providing the extra flexibility of "double-matching" (e.g., where matches can occur at more than one table). For example, a first table can be utilized for matching over a first range (e.g., 10-20) and a second table can be utilized for matching over a second range (e.g., 15-25), where a value of 17 provides a match at both tables. A third table that selects one match out of the both matches can be placed sequentially after the two parallel tables. The third table can include an action to be performed in the event of matching in all tables.

Figure 10A:
FIGS. 10A and 10B illustrate an example of classifying.
Figure 10A:
Figure 10B:
Figure 10B:

FIGS. 10A and 10B depict examples of use of a multi-table classifier to determine an action for a packet. Referring to FIG. 10A, a received packet has fields A and B with respective values of 45 and 50. A first table, Table 1, includes a range of values of Field A (e.g., 40-50 and 0-50). In Table 1, a match on an entry with a range 40-50 occurs with an index of 20. Table 2 is inspected to see if there is a match on index of 20 for Field B. In this example, Table 2 has a range of Field B between 30-40 and there is no match with Field B because the packet's Field B is 50, which is not within the range of 30-40. As there is no match, no action is taken. Priority can be applied whereby a match entry with a higher priority is applied over a lower priority match entry.

FIG. 10B depicts another example, where the same packet is matched against Tables 1 and 2. As in the example of FIG. 10A, checking of Field A against Table 1 yields a match with an index of 20. Index 20 is used to check if an entry in Table 2 includes a value or range of values in Field B that intersect or encompass the value of Field B in the packet. The value of Field B in the packet is 50 and an entry with a Field B range of 50-60 includes the value of Field B from the packet. Action B is identified from Table 2 as the action to be performed.

Various embodiments provide for increasing available depth allow for classifier space analysis to be performed in the control plane running on the processor or in a remote controller. The control plane can identify overlaps between classifier entries and break them down into sub-entries, such that width extension can be emulated to some degree (e.g., more memory used in the data plane).

In accordance with some embodiments, schema for increasing available width of a classifier are provided. In some embodiments, a matching rule is analyzed and broken down into non-overlapping sub-rules, where only one rule can match at any given table. A sub-rule is implemented in a first table, where the first table can be implemented as multiple sub-tables depending on hardware restrictions. In some embodiments, where multiple sub-tables are utilized, various embodiments can select one match from the matches from each of the sub-tables, where necessary. If there is a match in multiple entries, any combination of matches can be applied. In some cases, highest priority matches are applied. In some embodiments, the sub-rules of the sub-tables are non-overlapping, such that only one match will be generated from the multiple sub-tables. Rules for ternary or range matching can be implemented in a second table. The tables can be chained together such that the output of the first table (e.g., one result) is fed into the second table for further matching.

In one embodiment, chaining of tables is utilized where the first table is limited to exact-match match type. There may be no priority between exact-match rules. For example, a rule can be taken that matches many fields, where the fields that require only exact-match are matched in the first table, and the other fields that require ternary or range matches are matched in a second table. To generalize, the wide match key space can be divided into N number of sub-tables, e.g., t_1, t_2, . . . t_{N−1}, t_N, as long as the match type required for fields in t_1 to t_{N−1} is exact-match. Only the last table t_N does ternary or range match with different priorities. The chaining can be performed by returning a match index from previous t_{i−1} and exact-matches on the index in the next table t_i. For example, in one embodiment exact matches can be performed in SRAM, and the second table is TCAM. For three or more tables, any combination of SRAM and TCAM can be used.

It should be appreciated that each table t_i in the chain sequence can be comprised of multiple sub-tables for depth extension for parallel tables with overlap. In some embodiments, restrictions can be placed on the users limiting the use of ternary or range matching. For example, in the case of encapsulation, packets can include two headers: the outer header and the inner header (e.g., outer n-tuple and inner n-tuple). In such a case, matching of the outer header can be limited to exact match in the first table, where a range or ternary match can be implemented for the inner header.

Figure 11:
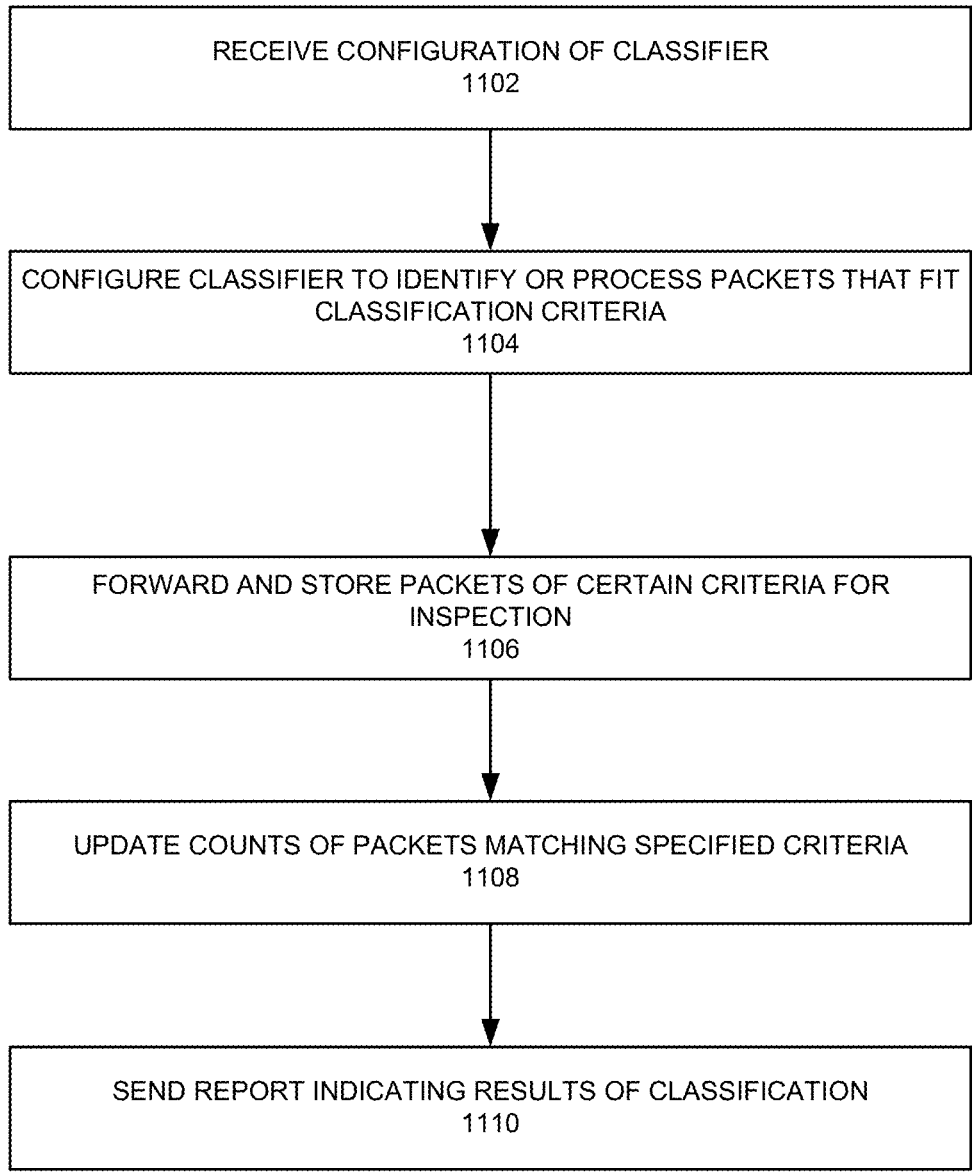
FIG. 11 illustrates a process.

FIG. 11 depicts a process used to classify one or more packets. At 1102, configuration of a classifier can be received. The configuration can be received from a control plane. A configuration file can be provided (e.g., P4 file). At 1104, a classifier can be configured to identify or process packets that match classification criteria. The classification criteria can be specified in the configuration file. For example, a match-action unit can be configured as a classifier. The identifying or processing can be one or more of: packet counting (at RX or TX), packet byte counting (RX or TX), header values fitting within a range, determining elapsed time since packet transmit and other examples. The classifier can be configured at a receive MAC, ingress pipeline, or transmit MAC. At 1106, a classifier can be configured to transfer packets of certain characteristics or not meeting certain characteristics to a CPU. For example, the configuration file can specify forwarding to a buffer or queue of packets that meet certain criteria to the CPU and inspection. At 1108, an update of a count of packets matching classification criteria can occur. For example, a classifier can count packets that fit certain criteria and update a counter of packets that fit that criteria. At 1010, a report can be generated to indicate packets or distribution of packets that meet classification. For example, counts of packets that match classification criteria can be sent to a control plane or remote controller to identify packet characteristics of packets received from a DUT or NUT or transmitted to a DUT or NUT. Various examples of reporting are described herein.

Figure 12:
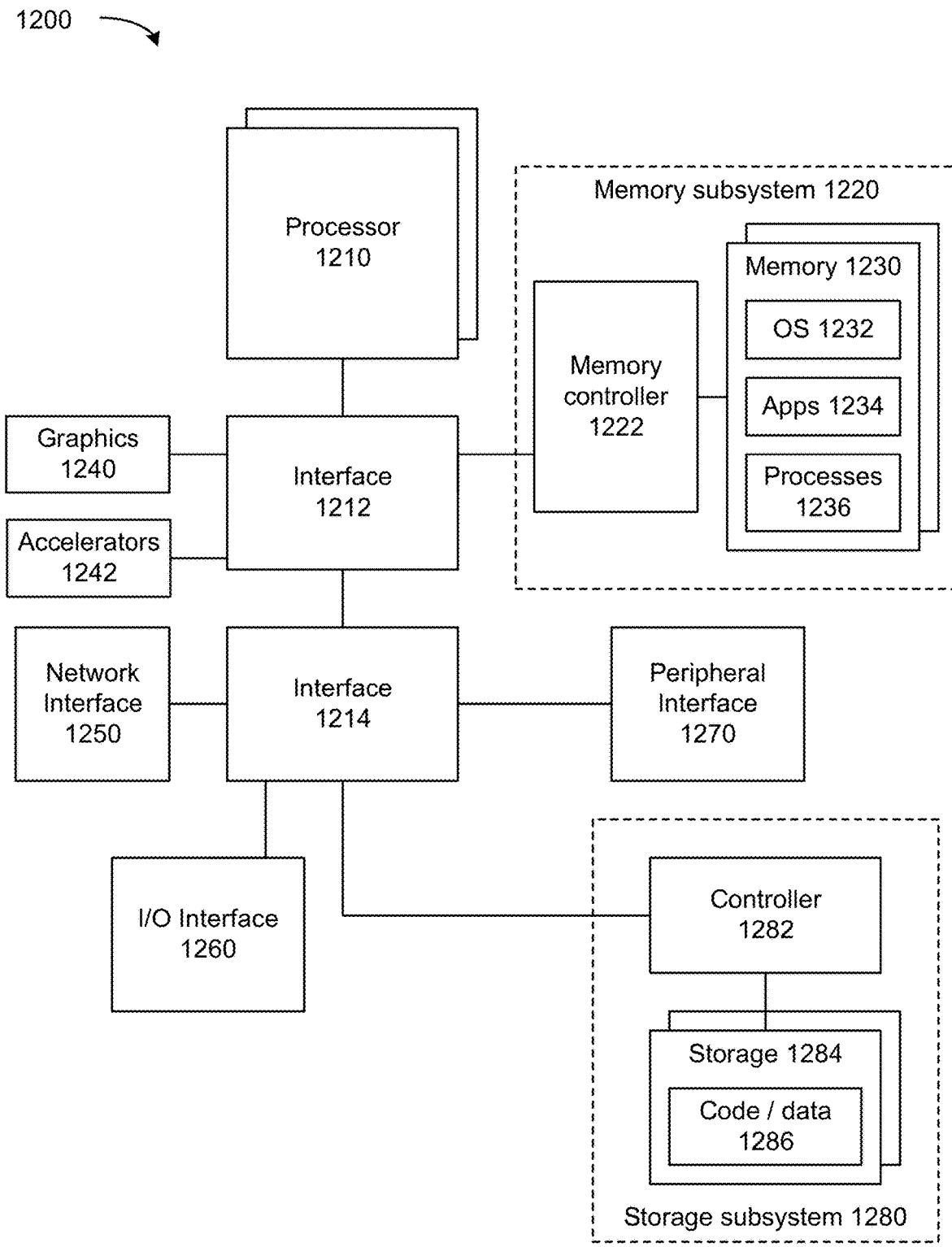
FIG. 12 depicts a system.

FIG. 12 depicts a system. The system can use embodiments described herein to program a forwarding element or received reports or packets from the forwarding element. System 1200 includes processor 1210, which provides processing, operation management, and execution of instructions for system 1200. Processor 1210 can include any type of microprocessor, central processing unit (CPU), graphics processing unit (GPU), processing core, or other processing hardware to provide processing for system 1200, or a combination of processors. Processor 1210 controls the overall operation of system 1200, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 1200 includes interface 1212 coupled to processor 1210, which can represent a higher speed interface or a high throughput interface for system components that needs higher bandwidth connections, such as memory subsystem 1220 or graphics interface components 1240, or accelerators 1242. Interface 1212 represents an interface circuit, which can be a standalone component or integrated onto a processor die. Where present, graphics interface 440 interfaces to graphics components for providing a visual display to a user of system 1200. In one example, graphics interface 1240 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 1240 generates a display based on data stored in memory 1230 or based on operations executed by processor 1210 or both. In one example, graphics interface 1240 generates a display based on data stored in memory 1230 or based on operations executed by processor 1210 or both.

Accelerators 1242 can be a programmable or fixed function offload engine that can be accessed or used by a processor 1210. For example, an accelerator among accelerators 1242 can provide compression (DC) capability, cryptography services such as public key encryption (PKE), cipher, hash/authentication capabilities, decryption, or other capabilities or services. In some embodiments, in addition or alternatively, an accelerator among accelerators 1242 provides field select controller capabilities as described herein. In some cases, accelerators 1242 can be integrated into a CPU socket (e.g., a connector to a motherboard or circuit board that includes a CPU and provides an electrical interface with the CPU). For example, accelerators 1242 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 1242 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 1220 represents the main memory of system 1200 and provides storage for code to be executed by processor 1210, or data values to be used in executing a routine. Memory subsystem 1220 can include one or more memory devices 1230 such as read-only memory (ROM), flash memory, one or more varieties of random access memory (RAM) such as DRAM, or other memory devices, or a combination of such devices. Memory 1230 stores and hosts, among other things, operating system (OS) 1232 to provide a software platform for execution of instructions in system 1200. Additionally, applications 1234 can execute on the software platform of OS 1232 from memory 1230. Applications 1234 represent programs that have their own operational logic to perform execution of one or more functions. Processes 1236 represent agents or routines that provide auxiliary functions to OS 1232 or one or more applications 1234 or a combination. OS 1232, applications 1234, and processes 1236 provide software logic to provide functions for system 1200. In one example, memory subsystem 1220 includes memory controller 1222, which is a memory controller to generate and issue commands to memory 1230. It will be understood that memory controller 1222 could be a physical part of processor 1210 or a physical part of interface 1212. For example, memory controller 1222 can be an integrated memory controller, integrated onto a circuit with processor 1210.

While not specifically illustrated, it will be understood that system 1200 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 1200 includes interface 1214, which can be coupled to interface 1212. In one example, interface 1214 represents an interface circuit, which can include standalone components and integrated circuitry. In one example, multiple user interface components or peripheral components, or both, couple to interface 1214. Network interface 1250 provides system 1200 the ability to communicate with remote devices (e.g., servers or other computing devices) over one or more networks. Network interface 1250 can include an Ethernet adapter, wireless interconnection components, cellular network interconnection components, USB (universal serial bus), or other wired or wireless standards-based or proprietary interfaces. Network interface 1250 can transmit data to a device that is in the same data center or rack or a remote device, which can include sending data stored in memory. Network interface 1250 can receive data from a remote device, which can include storing received data into memory. Various embodiments can be used in connection with network interface 1250, processor 1210, and memory subsystem 1220.

In one example, system 1200 includes one or more input/output (I/O) interface(s) 1260. I/O interface 1260 can include one or more interface components through which a user interacts with system 1200 (e.g., audio, alphanumeric, tactile/touch, or other interfacing). Peripheral interface 1270 can include any hardware interface not specifically mentioned above. Peripherals refer generally to devices that connect dependently to system 1200. A dependent connection is one where system 1200 provides the software platform or hardware platform or both on which operation executes, and with which a user interacts.

In one example, system 1200 includes storage subsystem 1280 to store data in a nonvolatile manner. In one example, in certain system implementations, at least certain components of storage 1280 can overlap with components of memory subsystem 1220. Storage subsystem 1280 includes storage device(s) 1284, which can be or include any conventional medium for storing large amounts of data in a nonvolatile manner, such as one or more magnetic, solid state, or optical based disks, or a combination. Storage 1284 holds code or instructions and data 1286 in a persistent state (e.g., the value is retained despite interruption of power to system 1200). Storage 1284 can be generically considered to be a "memory," although memory 1230 is typically the executing or operating memory to provide instructions to processor 1210. Whereas storage 1284 is nonvolatile, memory 1230 can include volatile memory (e.g., the value or state of the data is indeterminate if power is interrupted to system 1200). In one example, storage subsystem 1280 includes controller 1282 to interface with storage 1284. In one example controller 1282 is a physical part of interface 1214 or processor 1210 or can include circuits or logic in both processor 1210 and interface 1214.

A volatile memory is memory whose state (and therefore the data stored in it) is indeterminate if power is interrupted to the device. Dynamic volatile memory requires refreshing the data stored in the device to maintain state. One example of dynamic volatile memory includes DRAM (Dynamic Random Access Memory), or some variant such as Synchronous DRAM (SDRAM). Another example of volatile memory includes cache or static random access memory (SRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 1200. More specifically, power source typically interfaces to one or multiple power supplies in system 1200 to provide power to the components of system 1200. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 1200 can be implemented using interconnected compute sleds of processors, memories, storages, network interfaces, and other components. High speed interconnects can be used such as compatible at least with Ethernet, PCIe, Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, CCIX, 3GPP Long Term Evolution (LTE) (4G), 3GPP 5G, and variations thereof. Communications can be compatible with remote direct memory access (RDMA), InfiniB and, Internet Wide Area RDMA Protocol (iWARP), quick UDP Internet Connections (QUIC), or RDMA over Converged Ethernet (RoCE). Data and logs can be stored and accessed using virtualized storage nodes using a protocol such as NVMe over Fabrics (NVMe-oF).

Figure 13:
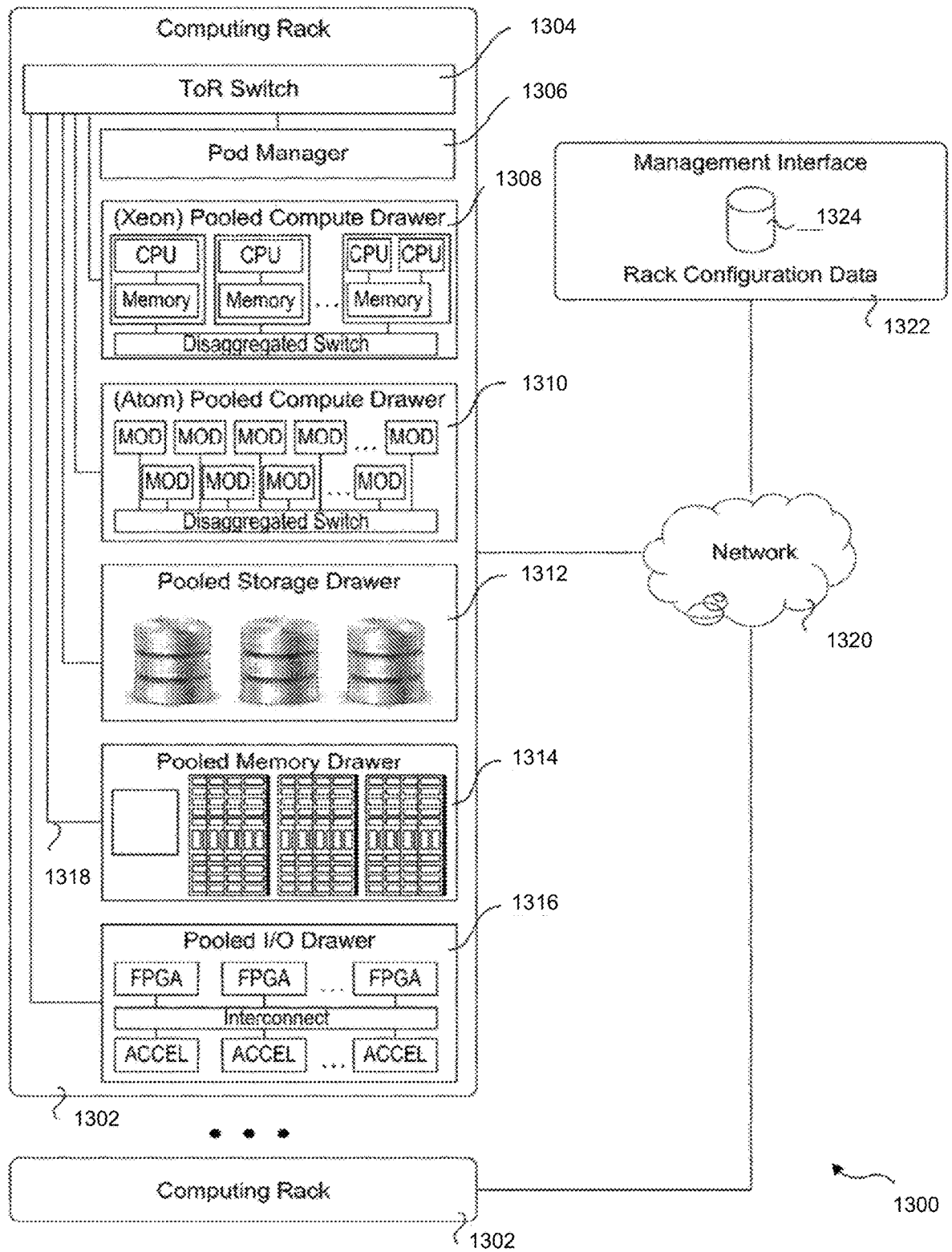
FIG. 13 depicts an environment.

FIG. 13 depicts an environment 1300 includes multiple computing racks 1302, some including a Top of Rack (ToR) switch 1304, a pod manager 1306, and a plurality of pooled system drawers. Various embodiments can be used in connection with programming or receiving content from forwarding elements acting network testers. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 1308, and Intel® ATOM™ pooled compute drawer 1310, a pooled storage drawer 1312, a pooled memory drawer 1314, and a pooled I/O drawer 1316. Some of the pooled system drawers is connected to ToR switch 1304 via a high-speed link 1318, such as a 40 Gigabit/second (Gb/s) or 100 Gb/s Ethernet link or a 100+ Gb/s Silicon Photonics (SiPh) optical link.

Multiple of the computing racks 1302 may be interconnected via their ToR switches 1304 (e.g., to a pod-level switch or data center switch), as illustrated by connections to a network 1320. In some embodiments, groups of computing racks 1302 are managed as separate pods via pod manager(s) 1306. In one embodiment, a single pod manager is used to manage racks in the pod. Alternatively, distributed pod managers may be used for pod management operations.

Environment 1300 further includes a management interface 1322 that is used to manage various aspects of the environment. This includes managing rack configuration, with corresponding parameters stored as rack configuration data 1324.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade includes components common to conventional servers, including a main printed circuit board (main board) providing internal wiring (e.g., buses) for coupling appropriate integrated circuits (ICs) and other components mounted to the board.

A network device can leverage a server or computing platform to perform packet processing using Network Function Virtualization (NFV), software-defined networking (SDN), virtualized network function (VNF), Evolved Packet Core (EPC), or 5G network slicing. Some example implementations of NFV are described in European Telecommunications Standards Institute (ETSI) specifications or Open Source NFV Management and Orchestration (MANO) from ETSI's Open Source Mano (OSM) group. VNF can include a service chain or sequence of virtualized tasks executed on generic configurable hardware such as firewalls, domain name system (DNS), caching or network address translation (NAT) and can run in virtual execution environments. VNFs can be linked together as a service chain. In some examples, EPC is a 3GPP-specified core architecture at least for Long Term Evolution (LTE) access. 5G network slicing can provide for multiplexing of virtualized and independent logical networks on the same physical network infrastructure.

Figure 14:
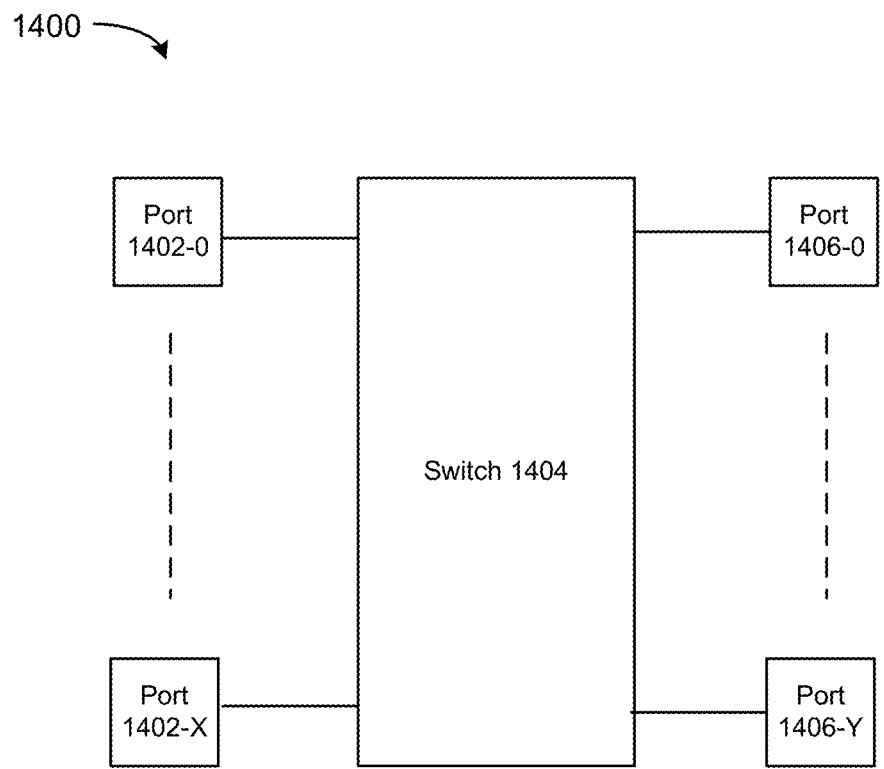
FIG. 14 depicts a switch.

FIG. 14 depicts a switch. Various embodiments of the switch can be configured as a network tester in accordance with embodiments described herein. Switch 1404 can route packets or frames of any format or in accordance with any specification from any port 1402-0 to 1402-X to any of ports 1406-0 to 1406-Y (or vice versa). Any of ports 1402-0 to 1402-X can be connected to a network of one or more interconnected devices. Similarly, any of ports 1406-0 to 1406-X can be connected to a network of one or more interconnected devices. Switch 1404 can decide which port to transfer packets or frames to using a table that maps packet characteristics with an associated output port or match-action tables. For example, match-action tables can be used whereby a hash of a portion of a packet is used as an index to find an entry. In addition, switch 1004 can perform packet replication for forwarding of a packet or frame to multiple ports and queuing of packets or frames prior to transfer to an output port. Some embodiments implement hash-lookup in P4 programing language, which is a programming language designed to allow programming of packet forwarding in data-planes. In contrast to general purpose language such as C or python, P4 is domain-specific language with a number of constructs optimized around network data forwarding.

Figure 15:
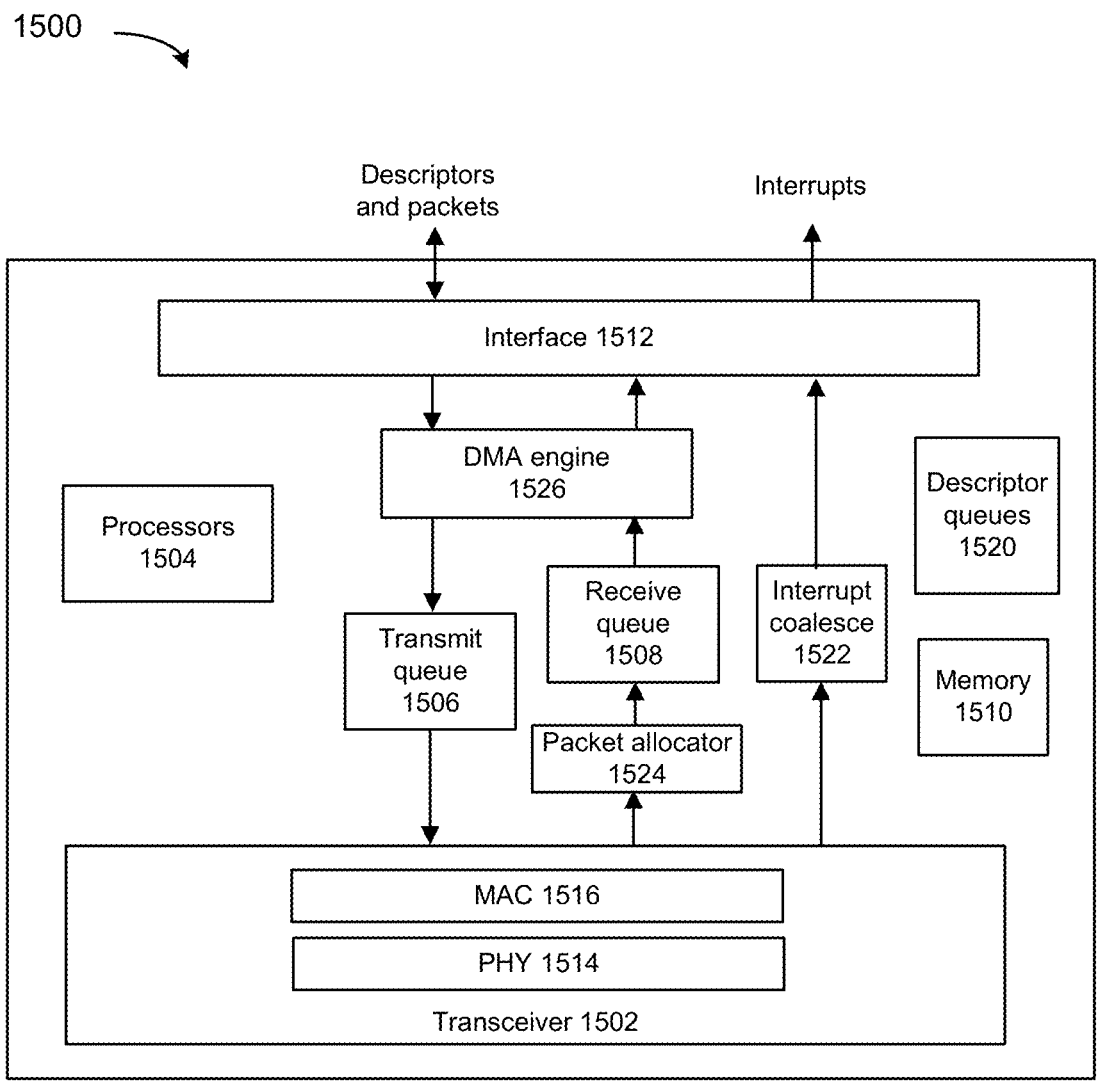
FIG. 15 depicts a network interface.

FIG. 15 depicts a network interface. In some examples, network interface can be configured as a network test device. Network interface 1500 can include transceiver 1502, processors 1504, transmit queue 1506, receive queue 1508, memory 1510, and bus interface 1512, and DMA engine 1526. Transceiver 1502 can be capable of receiving and transmitting packets in conformance with the applicable protocols such as Ethernet as described in IEEE 802.3, although other protocols may be used. Transceiver 1502 can receive and transmit packets from and to a network via a network medium (not depicted). Transceiver 1502 can include physical layer (PHY) circuitry 1514 and media access control (MAC) circuitry 1516. PHY circuitry 1514 can include encoding and decoding circuitry (not shown) to encode and decode data packets according to applicable physical layer specifications or standards. MAC circuitry 1516 can be configured to assemble data to be transmitted into packets, that include destination and source addresses along with network control information and error detection hash values. MAC circuitry 1516 can be configured to process MAC headers of received packets by verifying data integrity, removing preambles and padding, and providing packet content for processing by higher layers.

Processors 1504 can be any a combination of a: processor, core, graphics processing unit (GPU), field programmable gate array (FPGA), application specific integrated circuit (ASIC), programmable logic device (PLD) or other programmable hardware device that allow programming of network interface 1500. For example, processors 1504 can provide for allocation or deallocation of intermediate queues. For example, a "smart network interface" can provide packet processing capabilities in the network interface using processors 1504.

Packet allocator 1524 can provide distribution of received packets for processing by multiple CPUs or cores using timeslot allocation described herein or RSS. When packet allocator 1524 uses RSS, packet allocator 1524 can calculate a hash or make another determination based on contents of a received packet to determine which CPU or core is to process a packet.

Interrupt coalesce 1522 can perform interrupt moderation whereby network interface interrupt coalesce 1522 waits for multiple packets to arrive, or for a time-out to expire, before generating an interrupt to host system to process received packet(s). Receive Segment Coalescing (RSC) can be performed by network interface 1500 whereby portions of incoming packets are combined into segments of a packet. Network interface 1500 provides this coalesced packet to an application.

Direct memory access (DMA) engine 1526 can copy a packet header, packet payload, and/or descriptor directly from host memory to the network interface or vice versa, instead of copying the packet to an intermediate buffer at the host and then using another copy operation from the intermediate buffer to the destination buffer.

Memory 1510 can be any type of volatile or non-volatile memory device and can store any queue or instructions used to program network interface 1500. Transmit queue 1506 can include data or references to data for transmission by network interface. Receive queue 1508 can include data or references to data that was received by network interface from a network. Descriptor queues 1520 can include descriptors that reference data or packets in transmit queue 1506 or receive queue 1508. Bus interface 1512 can provide an interface with host device (not depicted). For example, bus interface 1512 can be compatible with peripheral connect Peripheral Component Interconnect (PCI), PCI Express, PCI-x, Serial ATA (SATA), and/or Universal Serial Bus (USB) compatible interface (although other interconnection standards may be used).

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," "logic," "circuit," or "circuitry." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes a method comprising: configuring a programmable data plane packet engine of a network element to emulate a network tester and to generate one or more test streams of packets and transmit the one or more test streams of packets to at least one device under test.

Example 2 includes any example and includes configuring the programmable data plane packet engine of the network element to modify a test stream of packets and transmit multiple test streams of packets to at least one device under test so that the programmable data plane packet engine of the network element emulates multiple host devices.

Example 3 includes any example, wherein: configuring a programmable data plane packet engine of a network element to generate one or more test streams of packets comprises: during runtime of a network, generating a stream of at least one type of test packet by copying the at least one type of test packet while re-circulating test packets of the stream.

Example 4 includes any example, wherein: configuring a programmable data plane packet engine of a network element to generate one or more test streams of packets comprises: copying a template packet received from a control plane while re-circulating the template packet through the programmable data plane packet engine to increase a number of template packets.

Example 5 includes any example, wherein the programmable data plane packet engine of a network element comprises programmable ingress and egress pipelines.

Example 6 includes any example, wherein: configuring a programmable data plane packet engine of a network element to generate one or more test streams of packets comprises: modifying one or more header field of one or more test streams of packets based on a configuration setting.

Example 7 includes any example, wherein the modifying one or more header field comprises one or more of: increase a header field value of packets up to a maximum value, applying a same value to a header field of a number of packets before changing the value applied to the field, or applying hierarchical execution of header field modifiers.

Example 8 includes any example, wherein the modifying one or more header field comprises the programmable data plane packet engine of the network element emulating multiple host devices.

Example 9 includes any example, and includes injecting state information into packets of one or more test streams of packets prior to transmission.

Example 10 includes any example, wherein the state information comprises one or more of: a time stamp at egress, a stream identifier, and a stream and output port identifier.

Example 11 includes any example, and includes configuring the programmable data plane packet engine of a network element to classify packets received from the at least one device under test.

Example 12 includes any example, and includes for packets received from the at least one device under test, counting occurrences of packet header values within a range.

Example 13 includes any example, and includes for packets received from the at least one device under test, counting occurrences of one or more of: packets with errors at a media access controller (MAC), number of packets received, or bytes per packet received.

Example 14 includes any example, and includes performing multi-table lookup for classification of multiple header fields of received packets.

Example 15 includes any example, and includes receiving a timestamp value from a remote controller; storing the timestamp value in a register of the network element; and updating a timestamp counter based on the stored timestamp value.

Example 16 includes any example, and includes injecting state information into packets one or more test streams of packets prior to transmission, wherein the state information comprises a timestamp counter, based on the stored timestamp value, corresponding to a time of egress.

Example 17 includes any example, and includes based on receipt of a packet with state information comprising a timestamp counter at time of egress, determining a timestamp counter value at time of receipt of the packet and determining round-trip latency based on the timestamp counter value at time of receipt of the packet and the timestamp counter at time of egress.

Example 18 includes any example, and includes an apparatus comprising: a programmable data plane packet engine of a network element, the programmable data plane packet engine configured to emulate a network tester and to generate one or more test streams of packets and transmit the one or more test streams of packets to at least one device under test.

Example 19 includes any example, wherein the programmable data plane packet engine is configured to modify a test stream of packets and transmit multiple test streams of packets to at least one device under test so that the programmable data plane packet engine of the network element emulates multiple host devices.

Example 20 includes any example, wherein the programmable data plane packet engine is configured using a Python language file.

Example 21 includes any example, wherein the programmable data plane packet engine is configured to generate a stream of at least one type of test packet by re-circulation of test packets and duplication of at least one type of test packet during re-circulation.

Example 22 includes any example, wherein the at least one type of test packet comprises a template packet.

Example 23 includes any example, wherein the programmable data plane packet engine comprises programmable ingress and egress pipelines.

Example 24 includes any example, wherein the programmable data plane packet engine is to modify one or more header fields of one or more test streams of packets by one or more of: increase a header field value of packets up to a maximum value, applying a same value to a header field of a number of packets before changing the value applied to the field, or applying hierarchical execution of header field modifiers.

Example 24 includes any example, wherein the programmable data plane packet engine is configured to inject state information into one or more test streams of packets prior to transmission.

Example 25 includes any example, wherein the state information comprises one or more of: a time stamp at egress, a stream identifier, and a stream and output port identifier.

Example 26 includes any example, wherein the programmable data plane packet engine is configured to classify packets received from the at least one device under test.

Example 27 includes any example, wherein to classify packets received from the at least one device under test, the programmable data plane packet engine is to count occurrences of packet header values within a range.

Example 28 includes any example, wherein to classify packets received from the at least one device under test, the programmable data plane packet engine is to count occurrences of one or more of: packets with errors at a media access controller (MAC), number of packets received, or bytes per packet received.

Example 29 includes any example, wherein to classify packets received from the at least one device under test, the programmable data plane packet engine is to perform multi-table lookup for classification of multiple header fields of received packets.

Example 30 includes any example, wherein the programmable data plane packet engine is configured to: receive a timestamp value from a remote controller; store the timestamp value in a register of the network element; and update a timestamp counter based on the stored timestamp value.

Example 31 includes any example, wherein the programmable data plane packet engine is configured to: inject a timestamp counter into packets one or more test streams of packets prior to transmission and determine a round-trip time based on the injected timestamp counter.

Example 32 includes any example, and includes a host computing system configured to generate a network test configuration file to configure the programmable data plane packet engine to perform one or more of: packet generation, packet modification, state injection, or packet classification.

What is claimed is:

1. A method comprising:
    configuring a programmable data plane packet engine of a network element to emulate a network tester and to generate one or more test streams of packets and transmit the one or more test streams of packets to at least one device under test:
    wherein:
        the programmable data plane packet engine comprises at least one control plane-programmable match action unit for use in generating the one or more test streams based upon match-action operations to be performed by the at least one control plane-programmable match action unit:
        the match-action operations comprise packet header field modification and packet classification:
        the packet header field modification is to be based upon the packet classification: and
        the packet header field modification is programmable so as to permit the programmable data plane packet engine to emulate a plurality of types of network testers.

2. The method of claim 1, comprising:
    configuring the programmable data plane packet engine of the network element to modify a test stream of packets and transmit multiple test streams of packets to at least one device under test so that the programmable data plane packet engine of the network element emulates multiple host devices.

3. The method of claim 1, wherein:
    configuring a programmable data plane packet engine of a network element to generate one or more test streams of packets comprises:
        during runtime of a network, generating a stream of at least one type of test packet by copying the at least one type of test packet while re-circulating test packets of the stream.

4. The method of claim 1, wherein:
    configuring a programmable data plane packet engine of a network element to generate one or more test streams of packets comprises:
        copying a template packet received from a control plane while re-circulating the template packet through the programmable data plane packet engine to increase a number of template packets.

5. The method of claim 1, wherein the programmable data plane packet engine of a network element comprises programmable ingress and egress pipelines.

6. The method of claim 1, wherein:
    configuring a programmable data plane packet engine of a network element to generate one or more test streams of packets comprises:
        modifying one or more header fields of one or more test streams of packets based on a configuration setting, wherein the modifying one or more header fields comprises one or more of: increasing a header field value of packets up to a maximum value, applying a same value to a header field of a number of packets before changing the value applied to the field, or applying hierarchical execution of header field modifiers.

7. The method of claim 6, wherein the modifying one or more header fields comprises the programmable data plane packet engine of the network element emulating multiple host devices.

8. The method of claim 1, comprising:
    injecting state information into packets of one or more test streams of packets prior to transmission, wherein the state information comprises one or more of: a time stamp at egress, a stream identifier, and a stream and output port identifier.

9. The method of claim 1, comprising:
    configuring the programmable data plane packet engine of a network element to classify packets received from the at least one device under test, wherein classifying comprises one or more of:
        for packets received from the at least one device under test, counting occurrences of packet header values within a range or
        for packets received from the at least one device under test, counting occurrences of one or more of: packets with errors at a media access controller (MAC), number of packets received, or bytes per packet received.

10. The method of claim 9, wherein classifying comprises performing multi-table lookup for classification of multiple header fields of received packets.

11. The method of claim 1, comprising:
    receiving a timestamp value from a remote controller;
    storing the timestamp value in a register of the network element; and updating a timestamp counter based on the stored timestamp value.

12. The method of claim 11, comprising:
    based on receipt of a packet with state information comprising a timestamp counter at time of egress, determining a timestamp counter value at time of receipt of the packet and determining round-trip latency based on the timestamp counter value at time of receipt of the packet and the timestamp counter at time of egress.

13. An apparatus comprising:
    a programmable data plane packet engine of a network element, the programmable data plane packet engine configured to emulate a network tester and to generate one or more test streams of packets and transmit the one or more test streams of packets to at least one device under test;
    wherein:
        the programmable data plane packet engine comprises at least one control plane-programmable match action unit for use in generating the one or more test streams based upon match-action operations to be performed by the at least one control plane-programmable match action unit:
        the match-action operations comprise packet header field modification and packet classification:
        the packet header field modification is to be based upon the packet classification: and the packet header field modification is programmable so as to permit the programmable data plane packet engine to emulate a plurality of types of network testers.

14. The apparatus of claim 13, wherein the programmable data plane packet engine is configured to modify a test stream of packets and transmit multiple test streams of packets to at least one device under test so that the programmable data plane packet engine of the network element emulates multiple host devices.

15. The apparatus of claim 13, wherein the programmable data plane packet engine is configured to generate a stream of at least one type of test packet by re-circulation of test packets and duplication of at least one type of test packet during re-circulation.

16. The apparatus of claim 13, wherein the programmable data plane packet engine comprises programmable ingress and egress pipelines.

17. The apparatus of claim 13, wherein the programmable data plane packet engine is to modify one or more header fields of one or more test streams of packets by one or more of: increasing a header field value of packets up to a maximum value, applying a same value to a header field of a number of packets before changing the value applied to the field, or applying hierarchical execution of header field modifiers.

18. The apparatus of claim 13, wherein the programmable data plane packet engine is configured to inject state information into one or more test streams of packets prior to transmission and wherein the state information comprises one or more of: a time stamp at egress, a stream identifier, and a stream and output port identifier.

19. The apparatus of claim 13, wherein the programmable data plane packet engine is configured to classify packets received from the at least one device under test and wherein to classify packets received from the at least one device under test, the programmable data plane packet engine is to count occurrences of packet header values within a range.

20. The apparatus of claim 19, wherein to classify packets received from the at least one device under test, the programmable data plane packet engine is to count occurrences of one or more of: packets with errors at a media access controller (MAC), number of packets received, or bytes per packet received.

21. The apparatus of claim 19, wherein to classify packets received from the at least one device under test, the programmable data plane packet engine is to perform multi-table lookup for classification of multiple header fields of received packets.

22. The apparatus of claim 13, wherein the programmable data plane packet engine is configured to:
receive a timestamp value from a remote controller;
store the timestamp value in a register of the network element; and
update a timestamp counter based on the stored timestamp value.

23. The apparatus of claim 13, wherein the programmable data plane packet engine is configured to:
inject a timestamp counter into packets one or more test streams of packets prior to transmission and
determine a round-trip time based on the injected timestamp counter.

* * * * *